(12) United States Patent
Ouyang et al.

(10) Patent No.: US 8,751,972 B2
(45) Date of Patent: Jun. 10, 2014

(54) COLLABORATIVE GESTURE-BASED INPUT LANGUAGE

(75) Inventors: Yu Ouyang, Cambridge, MA (US); Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 13/237,862

(22) Filed: Sep. 20, 2011

(65) Prior Publication Data

US 2013/0074014 A1    Mar. 21, 2013

(51) Int. Cl.
*G06F 3/033*    (2013.01)

(52) U.S. Cl.
USPC ........................................................ 715/863

(58) Field of Classification Search
None
See application file for complete search history.

(56) References Cited

U.S. PATENT DOCUMENTS

| | | | |
|---|---|---|---|
| 6,868,383 B1 | 3/2005 | Bangalore et al. | |
| 7,173,604 B2 * | 2/2007 | Marvit et al. | 345/156 |
| 7,903,115 B2 | 3/2011 | Platzer et al. | |
| 8,436,821 B1 * | 5/2013 | Plichta et al. | 345/173 |
| 2001/0002128 A1 * | 5/2001 | Takayama et al. | 345/352 |
| 2003/0076293 A1 | 4/2003 | Mattsson | |
| 2008/0059578 A1 | 3/2008 | Albertson et al. | |
| 2008/0143975 A1 | 6/2008 | Dennard et al. | |
| 2010/0100618 A1 | 4/2010 | Kuhlke et al. | |
| 2010/0100854 A1 * | 4/2010 | Russell et al. | 715/863 |
| 2010/0306261 A1 * | 12/2010 | Geisner et al. | 707/776 |
| 2010/0306714 A1 | 12/2010 | Latta et al. | |
| 2011/0055846 A1 * | 3/2011 | Perez et al. | 719/313 |
| 2011/0093820 A1 | 4/2011 | Zhang et al. | |
| 2011/0173204 A1 * | 7/2011 | Murillo et al. | 707/741 |
| 2011/0197147 A1 | 8/2011 | Fai | |
| 2011/0214055 A1 * | 9/2011 | Georgiev et al. | 715/702 |
| 2011/0296304 A1 | 12/2011 | Kempe | |
| 2011/0296353 A1 * | 12/2011 | Ahmed et al. | 715/848 |
| 2011/0314427 A1 * | 12/2011 | Sundararajan | 715/863 |
| 2012/0167017 A1 * | 6/2012 | Oh | 715/863 |

OTHER PUBLICATIONS

International Search Report and Written Opinion of international application No. PCT/US2012/056384, mailed Feb. 6, 2013, 11 pp.
Notice of Allowance from U.S. Appl. No. 13/250,848, dated Mar. 27, 2012, 23 pp.
U.S. Appl. No. 13/250,848, by Yu Ouyang, filed Sep. 30, 2011.
Dolphin Gesture Browser: Most Popular Features, found at http://www.dolphin-browser.com/, accessed Nov. 17, 2011, 4 pp.
Gesture Shortcuts—Android, found at http://www.androidzoom.com/android_applications/tools/gesture-shortcuts_qjbm.html, accessed Sep. 29, 2011, 3 pp.

(Continued)

*Primary Examiner* — Stephen Alvesteffer
(74) *Attorney, Agent, or Firm* — Shumaker & Sieffert, P.A.

(57) ABSTRACT

In one example, a method includes receiving, by a server, data representative of a group of gestures detected by the plurality of computing devices and data representative of one or more shortcuts associated with the group of gestures from a plurality of computing devices, wherein each shortcut corresponds to an action performed by at least one of the computing devices. The method may further include aggregating, by the server, the data representative of the gestures and the data representative of the associated shortcuts received from the plurality of computing devices based at least in part on detected similarities between at least one of 1) the group of gestures and 2) the associated shortcuts, and defining, by the server, a gesture-shortcut language based at least in part on the aggregated data.

21 Claims, 11 Drawing Sheets

(56) References Cited

OTHER PUBLICATIONS

HackerZ World!!!: How to Use Gesture Shortcuts on Your iOS Lockscreen, found at http://hack-kinng.blogspot.com/2011/08/how-to-use-gesture-shortcuts-on-your.html, accessed Sep. 29, 2011, 5 pp.

International Preliminary Report on Patentability of International application No. PCT/US2012/056384, mailed Apr. 3, 2014, 7 pp.

* cited by examiner

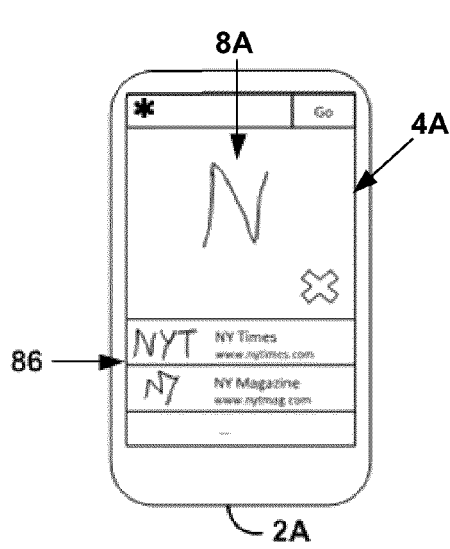 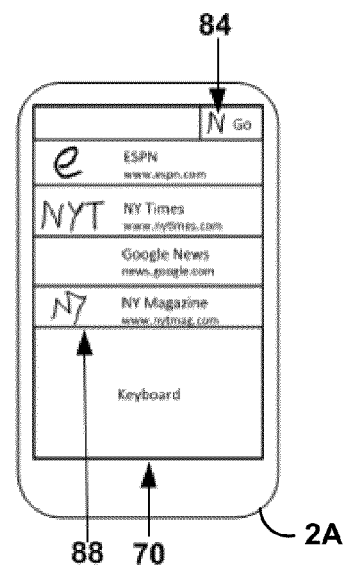
FIG. 10A   FIG. 10B
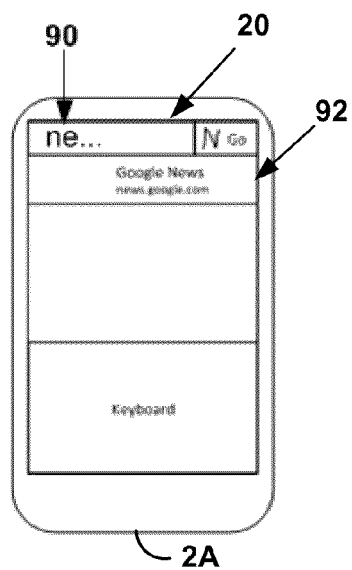 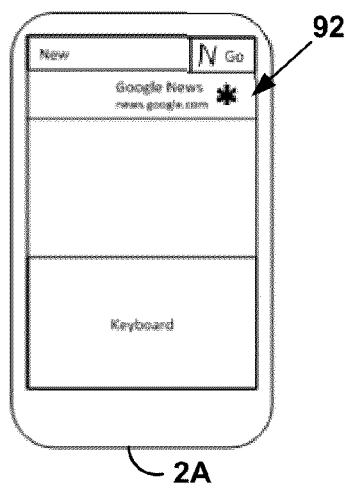
FIG. 10C   FIG. 10D

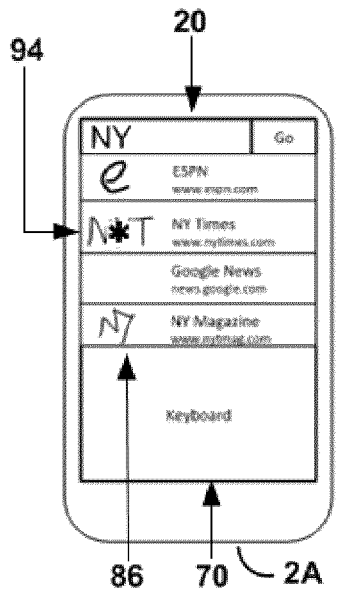
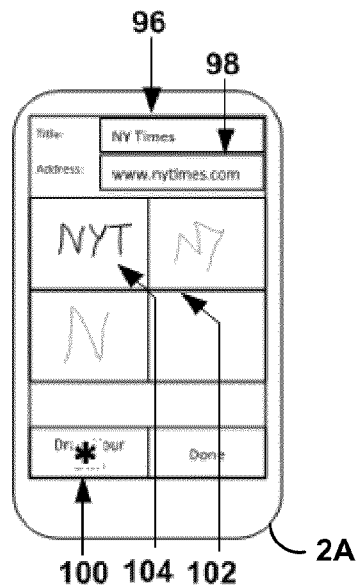
FIG. 11A
FIG. 11B
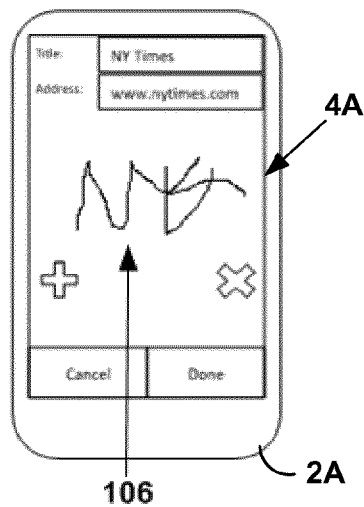
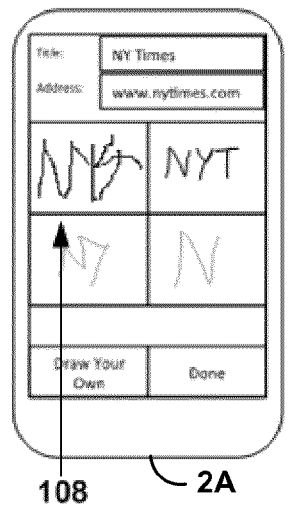
FIG. 11C
FIG. 11D

COLLABORATIVE GESTURE-BASED INPUT LANGUAGE

TECHNICAL FIELD

This disclosure relates to computing devices and, more particularly, to a gesture-based input language for a computing device.

BACKGROUND

Some known computing devices may include various hardware and software elements that may enable performance of a variety of tasks in response to user input. Conventionally, a user may interact with or otherwise activate the hardware and software elements through one or more interfaces (such as a keyboard, a mouse, a touch screen, etc.) by selecting one or more pre-configured graphical and/or hardware buttons (such as an icon, a switch, etc.).

For example, a user may use an Internet-enabled mobile device that browses the World Wide Web. The user may manually enter a Uniform Resource Locator (URL) for a desired webpage using a virtual keyboard or similar input device of the mobile device. The process of entering the URL may be complicated by the size or configuration of the input device. More specifically, the utility of virtual keyboards and other input devices designed for use with a mobile device (e.g., a smartphone) is often limited by the relatively small physical dimensions of the mobile device itself, negatively impacting the user experience.

One conventional solution is to implement gesture-based shortcuts that may be used to control a mobile device. A gesture (such as a pattern traced by a fingertip on a touch screen or other presence-sensitive device) may be detected by a mobile device. The detected gesture may be identified by the device and matched to one or more predefined shortcuts corresponding to one or more actions and/or operations performed by the device. In some instances, a computing device may graphically present to the user a list of the shortcuts associated with the detected gesture for selection by the user. Based at least in part on a received user selection, the computing device may then perform the one or more actions/operations corresponding to the selected shortcut (e.g., open a web browser application and connect to a specific location, execute a program, etc.).

In some instances, however, a user may not be willing to spend much effort to associate the gestures and shortcuts necessary to define a custom, user-specific gesture-based language. Further, the more gestures and shortcuts exist, the less likely it may be that the user will be able to recall the various custom-defined gestures and associated shortcuts. In other words, user-defined gesture-based languages may not scale. As the user-defined gesture-based language develops, the number of gesture and shortcut associations may reach the thousands, hundreds of thousands, or more such that the user may not be able to recall the various gestures and associated shortcuts of the gesture-based language. When a user is unable to recall the various gesture and associated shortcuts, the user may not use or otherwise abandon the gesture-based language and, instead, rely upon the keyboard for manual input.

SUMMARY

In one example of the disclosure, a method includes receiving, by a computing device, data representative of a gesture detected by a presence-sensitive screen of the computing device, identifying, by the computing device, a shortcut associated with the gesture, and providing for display, by the computing device, data representative of the shortcut. The shortcut corresponds to an action to be performed by the computing device. Identifying the shortcut comprises accessing at least a portion of an aggregated group of gesture-shortcut associations determined based at least in part upon prior user input from at least one other user.

In another example of the disclosure, a method includes receiving, by a server and from a plurality of computing devices, data representative of a group of gestures detected by the plurality of computing devices, and receiving, by the server, data representative of one or more shortcuts associated with the group of gestures from the plurality of computing devices, wherein each of the shortcuts corresponds to an action performed by at least one of the plurality of computing devices. The method further includes aggregating, by the server, the data representative of the group of gestures and the data representative of the associated shortcuts received from the plurality of computing devices based at least in part on detected similarities between at least one of 1) the group of gestures and 2) the associated shortcuts, and defining, by the server, a gesture-shortcut language based at least in part on the aggregated data, wherein the gesture-shortcut language includes at least a portion of the aggregated data representative of the group of gestures and associated shortcuts.

In another example of the disclosure, a computer-readable storage medium is encoded with instructions that, when executed, cause one or more processors of a computing device to perform operations, the operations including receiving data representative of a gesture detected by a presence-sensitive screen of the computing device. The operations further include identifying a shortcut associated with the gesture, wherein the shortcut corresponds to an action to be performed by the computing device, and wherein identifying the shortcut comprises accessing at least a portion of an aggregated group of gesture-shortcut associations determined based at least in part upon prior user input from at least one other user, and providing for display data representative of the shortcut.

In another example of the disclosure, a computer-readable storage medium is encoded with instructions that, when executed, cause one or more processors of a computing device to perform operations, the operations including receiving data representative of group of gestures detected by a plurality of computing devices, and receiving data representative of one or more shortcuts associated with the group of gestures, wherein each of the shortcuts corresponds to an action performed by at least one of the plurality of computing devices. The operations further include aggregating the data representative of the group of gestures and the data representative of the associated shortcuts received from the plurality of computing devices based at least in part on detected similarities between at least one of 1) the group of gestures and 2) the associated shortcuts, and defining a gesture-shortcut language based at least in part on the aggregated data, wherein the gesture-shortcut language includes at least a portion of the aggregated data representative of the group of gestures and associated shortcut.

In another example of the disclosure, a device comprises at least one processor, a network interface, and a language development module. The network interface is configured to receive data representative of gestures detected by a plurality of computing devices and receive data representative of one or more shortcuts associated with the gestures, wherein each of the shortcuts corresponds to an action performed by at least one of the plurality of computing devices. The language development module operable by the at least one processor to aggregate the data representative of the group of gestures and the data representative of the associated shortcuts received from the plurality of computing devices based at least in part on detected similarities between at least one of 1) the group of gestures and 2) the associated shortcuts, and define a gesture-shortcut language based at least in part on the aggregated data, wherein the gesture-shortcut language includes at least a portion of the aggregated data representative of the group of gestures and associated shortcuts.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 10A-10D are diagrams illustrating a gesture-based query followed by a text-based query for an example gesture-based application installed on the computing device shown in FIG. 1, in accordance with one or more aspects of the present disclosure.

FIGS. 11A-11D are diagrams illustrating shortcut editing in an example gesture-based application installed on the computing device shown in FIG. 1, in accordance with one or more aspects of the present disclosure.

DETAILED DESCRIPTION

In general, this disclosure describes techniques for defining a gesture-based language based at least in part on aggregated input of a plurality of users that may be used to control a computing device. In some embodiments, a gesture-based language that associates particular gestures to shortcuts may be defined by one or more computing devices based at least in part on user input from any number of users (e.g., a user population). In some examples, the user population may include one or more users of computing devices, each of whom performs input operation (e.g., gestures) based at least in part on the gesture-based language such that the computing device is directed to perform an action (e.g., executing a program or initiating one or more other operations). The one or more other operations may include, for example, altering settings on the computing device (e.g., volume control, screen brightness, and on/off), accessing a list of contacts, controlling music playing software, opening a particular document, etc.

Techniques of this disclosure employ a gesture language development process based at least in part on aggregated user information designed to improve the scalability of gesture-based language development. In some embodiments, shortcuts defined by one or more members of a user population can be aggregated to facilitate the definition of an initial set of gestures and associated shortcuts for each individual member of the user population. For example, rather than requiring an individual user to define an initial set of gesture-shortcut associations, certain aspects of this disclosure may enable an individual user to use an initial library of gesture-shortcut associations included in a gesture-based language developed using aggregated user input from other users. Further, techniques of this disclosure may enable the user to enter user input configured to define and/or customize the initial library of gesture-shortcut associations based at least in part on continued use of the computing device. In this manner, a user may utilize an initial library of gesture-shortcut associations that is formed based at least in part on aggregated user input of the user population while maintaining the ability for the user to create custom gesture-shortcut associations.

Figure 1:
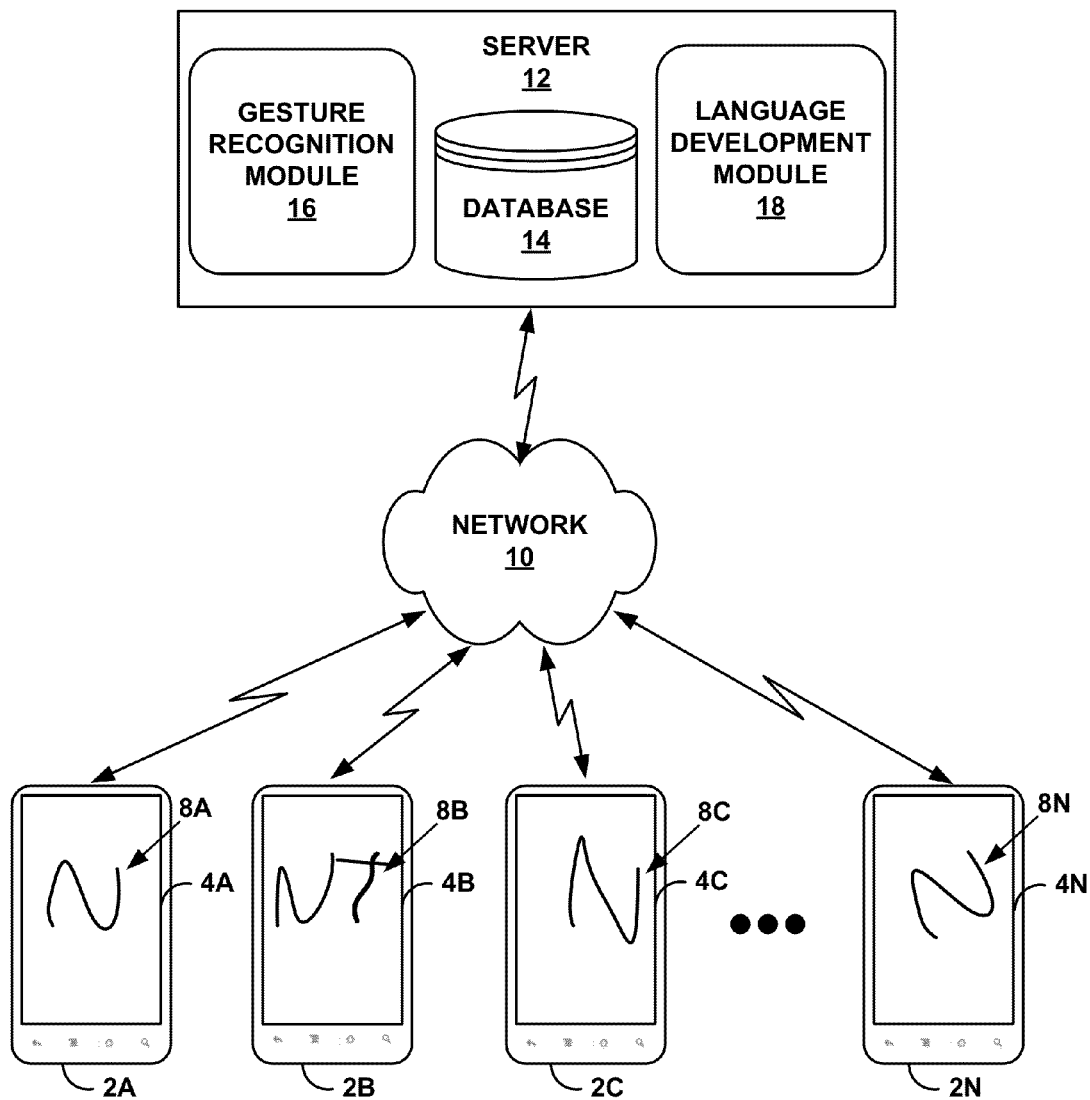
FIG. 1 is a block diagram illustrating an example system for collaborative development of a gesture language for control of a computing device, in accordance with one or more aspects of the present disclosure.

FIG. 1 is a block diagram illustrating an example system for collaborative development of a gesture language for control of computing devices 2. Server 12 may communicate with a plurality of computing devices 2A-2N (collectively, "computing devices 2") via network 10.

Computing devices 2 represent a plurality of computing devices controlled by a plurality of users. The users of the plurality of computing devices 2 are collectively referred to as the user population. Computing devices 2 may detect one or more gestures 8A-8N (collectively, "gestures 8") using a presence sensitive surface of the computing device (e.g., presence sensitive display 4A of computing device 2A). Computing devices 2 may analyze gestures 8 locally on the computing devices, transmit data or an image representative of gestures 8 to server 12 for analysis, or both analyze gestures 8 locally and transmit data to server 12 for analysis. Computing devices 2 may transmit data representative of an action performed by the computing device specified and a gesture detected by the computing device to server 12, contributing usage data to a database aggregating gesture-shortcut associations to develop a gesture-based language. The action performed by the computing device is represented by a shortcut and one or more gestures may be associated with the shortcut and one or more shortcuts may be associated with a gesture.

Computing devices 2 are coupled to server 12 through network 10 via a wired connection, wireless links, or both. Network 10 may include a telephone network (such as a cellular telephone network), a wide-area network (such as the Internet), a local-area network (LAN), an enterprise network, or one or more other types of networks). Computing devices 2 may transmit and receive data using network 10. In some examples, network 10 may include one or more different networks. For instance, computing devices 2 may communicate with a private or public network (e.g., the Internet) via a cellular telephone network data connection or primary wireless radio connection and computing devices 2 and server 12 may communicate using a LAN or a public network, such as the Internet, via secondary cellular or wireless radio channel.

Server 12 may be configured to analyze a gesture detected by computing devices 2, for example using Gesture Recognition Module (GRM) 16. Computing devices 2 may transmit data or images representative of gestures 8 to server 12 via network 10. GRM 16 of server 12 may compare the image or data representative of gestures 8 to images or data representative of known gestures stored in database 14 of server 12. In some examples, GRM 16 may use a visual based analysis system to decompose and identify the image of the detected gesture. To accelerate comparison with known gestures, images or data representative of known gestures may be arranged in a clustered hierarchy.

Known gestures sharing similar characteristics or components may be grouped together in a cluster. For example, gestures including a significant horizontal stroke through the center of mass of the gesture and a second stroke oriented vertically to one side of the center of mass may be clustered together based at least in part on the shared characteristics. Clusters of known gestures sharing some similar traits may be grouped together in parent clusters. For example multiple clusters, each cluster sharing the trait of a significant horizontal stroke through the center of mass, may be formed into a parent cluster. Further, a 'grandparent' cluster may be formed from all parent clusters having the trait of a significant horizontal stroke, and so on.

Comparing data or an image representative of a gesture 8 (e.g., gesture 8A) with known gestures to identify gesture 8A does not require comparing gesture 8A with every known gesture. Instead, comparisons may be made by progressing through the hierarchy of clustered gestures. In one example, the identification and association of gesture 8A to one or more shortcuts may include comparing data or images representative of gesture 8A to high level clusters, determining which parent cluster, if any, gesture 8A shares characteristics with (e.g., a significant horizontal stroke from the previous example). Gesture 8A may then be compared to the child clusters of the matched parent cluster, further identifying clusters of gestures that share characteristics with gesture 8A.

The identification process may continue progressing through the hierarchy of parent-child clusters until the known gestures that form one or more child clusters are reached and compared. In examples where gesture 8A is not identifiable as a known gesture, gesture 8A may be added into a cluster, provided there is a sufficient degree of similarity with the existing known gestures in the cluster. Alternatively or in addition, a new cluster may be created using gesture 8A. The new cluster may be independent of the existing clusters when gesture 8A differs from the known gesture clusters or the new cluster may be created as a new child cluster within the existing hierarchy of clusters. In various instances, gesture 8A is considered to differ from the known gesture clusters when a measure of difference between the features of the detected gesture (e.g., one or more of the distance regions of an image of the detected gesture shift to match with the known gesture, stroke number and/or length, and stroke orientation) and the known clusters exceeds a threshold amount.

Server 12 may be configured to store data or images representative of known gestures and associations between the known gestures and various shortcuts in a data repository (e.g., database 14). Database 14 may store a cluster hierarchy of known gestures, as developed by, for example, GRM 16. Database 14 may also be configured to store the usage history of gestures 8. The usage history may include data representative of gestures 8, frequency of use of each gesture 8, amount of time elapsed since last use of each gesture 8, historical frequency of use trends, and user population defined gesture-shortcut associations. In some examples, server 12 may store the definitions, the gesture-shortcut associations, of a gesture-based language in database 14. Access to the gesture-based language may enable GRM 16 to identify shortcuts associated with gestures 8 and transmit the identified shortcuts to computing devices 2 for presentation to the user.

Server 12 may be configured to define a gesture-based language for the user population using associated gestures and shortcuts aggregated from computing devices 2 of the user population. Computing devices 2 may transmit, to server 12 via network 10, shortcuts selected by the user population as corresponding to gestures 8. Language Development Module (LDM) 56 may aggregate gestures 8 detected on computing devices 2 and associate a gesture 8 with a shortcut selected by the user population. A selected shortcut may include a shortcut selected by the users of computing devices 2 as representing the desired action of computing devices 2 after inputting one or more gestures 8 on computing devices 2. LDM 18 may analyze the usage history of the detected gesture-shortcut associations to define a language based at least in part on the collective use of the detected gestures.

When associating gestures and shortcuts to form a gesture-based language, LDM 18 may account for factors including usage frequency and usage frequency over time. For example, gesture 8A may be repeatedly used by the user population to access the webpage "www.nytimes.com". LDM 64, based at least in part on the frequency of use, may define gesture 8A as corresponding to the action of navigating a web browser to "www.nytimes.com". Over time, the user population may no longer frequently use gesture 8A to navigate to "www.nytimes.com" and, instead, use gesture 8A to navigate to "www.nypost.com". LDM 64 may, because of the changing usage of gesture 8A, redefine gesture 8A to correspond to the action of navigating a web browser to "www.nypost.com". LDM 18 may assign multiple shortcut actions to a single a gesture, for example causing gesture 8A to correspond to both "www.nytimes.com" and "www.nypost.com" given sufficient use of both associations by the user population. LDM 18 may assign multiple gestures to the same shortcut action (e.g., by associating both gesture 8A and gesture 8B with www.nytimes.com).

Server 12 may distribute the collaboratively developed gesture-based language and the corresponding clustered gesture hierarchy to computing devices 2 of the user population. Server 12 may distribute all or a portion of the gesture-based language. The distributed gesture-based language may be locally cached by a computing device 2A and may include a subset of all gestures, and gesture-shortcut associations, forming the gesture-based language. Server 12 may select gestures and gesture-shortcut associations for distribution based at least in part on popularity (e.g., frequency of use by the user population), by local use (e.g., selecting gestures and gesture-shortcut associations corresponding to activities frequently performed by a particular computing device), or other standards. Computing devices 2 may utilize the distributed gesture-based language to locally identify gesture-shortcut associations that may have been used by the user population but not by an individual user of the computing device. In some examples, computing devices 2 may transmit locally created associations between gestures and shortcuts to server 12.

Server 12 may store these locally created associations, for example in database 14. Computing devices 2 may use the copies of locally created associations stored on server 12 as backup copies of the associations or to assist a user in device migration. The server-stored copies of the association may enable a user to reload a customized gesture library onto a new or different computing device.

In some examples, computing devices 2 or server 12 may employ handwriting recognition techniques in combination with, or to supplement, the gesture-based language. Computing devices 2 and server 12 may treat handwriting detected on computing devices 2 as another arbitrary gesture. This approach may cause server 12 and computing devices 2 to define large numbers of similar gestures corresponding to each shortcut for which handwriting is used. For example, due to variations in handwriting, separate gestures each corresponding to the letter "M" may be created for Maps, Music, www.msn.com, and so on. Recognizing the image of "M" as the letter "M" may allow server 12 and/or computing device 2 to define fewer gestures, which may reduce the amount of memory used to identify and store the gestures as well as decrease the amount of time required to identify the appropriate shortcut, for example, by displaying partial matches as text is written on presence sensitive screen 4 of computing devices 2.

Handwriting may be recognized based at least in part on the image of the handwritten letters and/or the component stroke fragments that form the image of the letters. Computing devices 2 or server 12 may segment characters detected on presence sensitive surface 4 of computing devices 2, breaking the image of the handwriting apart into a series of stroke fragments. For example, computing devices 2 or server 12 may segment the text strokes about the local minima and maxima of the strokes on the y-axis of the image of the detected handwriting gesture. GRM 16 of server 12 or GRM 42 (FIG. 3) of computing device 2A may be configured to analyze the stroke fragments, in various instances, by applying a character recognizer to groups of stroke fragments and measuring how closely the different possible groupings of stroke fragments represent the images of letters in order to identify the letter handwritten letter.

Server 12 or computing devices 2 may perform handwriting and gesture analysis simultaneously or sequentially. In some examples, a handwriting sample may be unrecognizable as text to GRM 16 or 42 and the handwriting analysis may fail to reach a result or may produce an incorrect interpretation of the image. Gesture analysis, based at least in part on the image of previously detected handwriting gestures rather than the pattern of stroke fragments forming the letters of the handwriting gesture, may successfully identify the detected handwriting gesture and enable computing devices 2 or server 12 to identify the appropriate corresponding shortcut.

In some examples, both handwriting recognition and gesture analysis may be performed on the same detected gesture (e.g., gesture 8A). In these examples, the handwriting recognition and gesture analysis may identify different shortcuts associated with the same detected gesture. Each identified shortcut may be assigned a rank upon being identified using handwriting recognition and gesture analysis. The rank may be based at least in part on various factors including the source of the identification (e.g., being identified by the computing device 2A by matching a user-defined gesture-shortcut association stored within computing device 2A versus being identified by server 12 using a letter-shortcut association defined by other users). The identified shortcut having the highest rank may be selected as the identified shortcut and output to the user.

Combining the handwriting recognition techniques with the gesture analysis techniques may provide certain advantages. For example, combining the information from the two sources may improve prediction accuracy. When detecting a gesture, computing devices 2 and/or server 12 may store a visual template of the gesture as well as perform handwriting recognition on the detected gesture. The next time a user draws the same textual string, computing devices 2 and/or server 12 may rely on the stored visual template of the gesture to correctly identify the associated shortcut even if the new gesture is too messy to be recognized correctly as handwriting.

Figure 2:
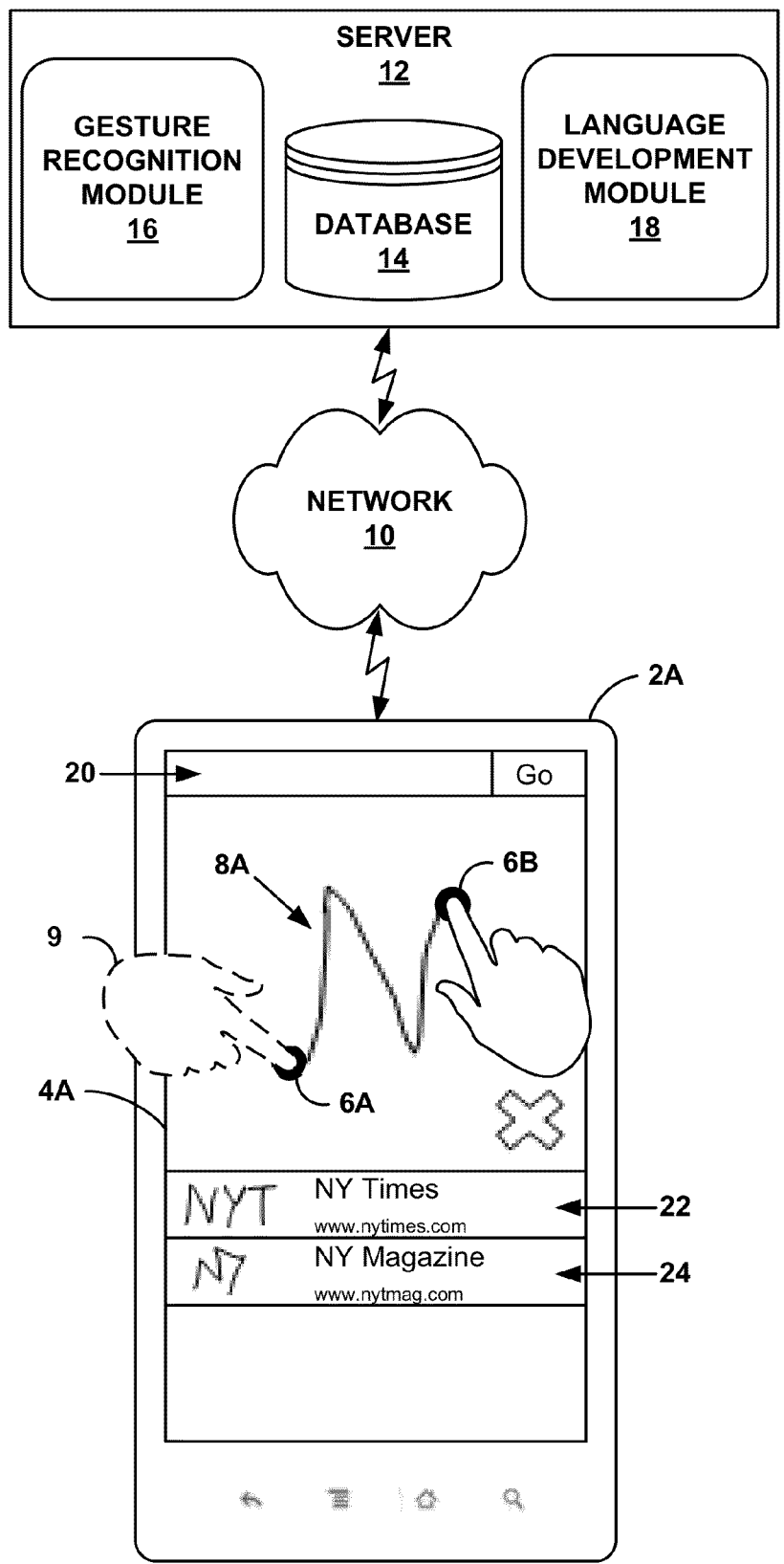
FIG. 2 is a block diagram illustrating an example computing device that utilizes gestures for control of the computing device shown in FIG. 1, in accordance with one or more aspects of the present disclosure.

FIG. 2 is a block diagram illustrating an example computing device 2A that utilizes gestures for control of the computing device shown in FIG. 1, in accordance with one or more aspects of the present disclosure. Computing device 2A may communicate with server 12 via network 10.

Examples of computing device 2A may include, but are not limited to, portable or mobile devices (such as cellular phones, personal digital assistants (PDAs), portable gaming devices, portable media players, e-book readers, etc.) as well as non-portable devices (such as desktop computers, etc.). A gesture (e.g., gesture 8A) may include, but is not limited to, a path traced by a fingertip (e.g., from position 6A to position 6B), stylus, or similar object on presence sensitive input device 4A, such as the touch screen of a smartphone. Gesture 8A may include a single or multiple strokes and need not form a single continuous path. In some examples, a software routine may render gesture 8A scale and rotationally independent, so that the size or orientation of the drawing of gesture 8A does not affect identification of the gesture.

Computing device 2A is coupled to network 10 via a wired connection, wireless links, or both. Computing device 2A may transmit and receive data over network 10. Computing device 2A may include multiple connections to network 10 (e.g., maintaining both a cellular data and wireless radio internet connection). Computing device 2A may communicate with server 12 over network 10. Network 10 may include one or more forms of electronic communication and use multiple channels of one or more types of electronic communication.

Computing device 2A may detect the presence of gesture 8A on presence sensitive interface 4A. Presence sensitive interface 4A may, in some examples, be a touch screen, track pad, or similar device. User 9 may draw gesture 8A on the surface of computing device 2A. Computing device 2A may store an image of gesture 8A and record data representative of gesture 8A (such as the beginning and ending points of one or more strokes that form gesture 8A) and images of features (such as the vertical, horizontal, diagonal, or other strokes that may form gesture 8A) of gesture 8A.

Computing device 2A may identify gesture 8A by comparing gesture 8A to a database of known gestures stored locally on computing device 2A. The database of known gestures may be arranged in a clustered hierarchy to reduce the amount of time required to identify gesture 8A. In some examples, computing device 2A may transmit an image or data representative of gesture 8A to server 12 via network 10 for identification of gesture 8A by server 12 (e.g., via GRM 16 of server 12). Gesture identification may also be performed by computing device 2A in parallel with server 12. For example, computing device 2A may identify gesture 8A using a locally stored gesture-based language while server 12 also performs the identification using a complete gesture-based language.

Differences in identification of the gesture and the association of the shortcut with gesture 8A may be resolved by selection by the user of the desired shortcut or, as another example, based at least in part on the amount error in the match between gesture 8A and the known gesture.

Computing device 2A may apply a gesture-based language to an identified gesture 8A to identify one or more shortcuts corresponding to gesture. The gesture-based language, or a plurality of associated gestures and shortcuts forming a subset of the language, may be received from server 12 and stored locally on computing device 2A. The gesture language may, for example, be stored in computing device 2A as a database, lookup table, or index, where computing device 2A accesses the entry of the identified gesture to retrieve the associated shortcuts. Computing device 2A may also retrieve other known gestures associated with the retrieved shortcuts, enabling computing device 2A to display alternative gestures to access a particular shortcut. In some examples, determination of one or more shortcuts associated with identified gesture 8A may occur on server 12, either alternatively to or in parallel with identification taking place on computing device 2A. Server 12 may transmit an associated shortcut, or data representative of the associated shortcut, identified on server 12 to computing device 2A for presentation to a user of computing device 2A.

Computing device 2A may display one or more shortcuts (e.g., shortcuts 10 and 12) associated with identified gesture 8A for selection by a user (e.g., user 9). The shortcuts may be displayed in any order, including an order based at least in part on the frequency of the association of gesture 8A and the shortcut, locally set preferences (e.g., a user of computing device 2A routinely associates gesture 8A with the shortcut), and various other characteristics of the gesture-shortcut association (e.g., alphabetization). For example, shortcut 24 may be typically mapped with gesture 8A by the user of computing device 2A. As the user of computing device 2A repeatedly associates identified gesture 8A with shortcut 24, it may be likely that the user intends to access shortcut 24 by inputting gesture 8A on the presence sensitive device 4 of computing device 2A and that shortcut 24 should be displayed relatively early in the results list of shortcuts. Shortcut 22 may be typically associated with identified gesture 8A by the user population. The gesture-based language, as determined by LDM 18 of server 12, may map gesture 8A with shortcut 22, which may cause computing device 2A to display shortcut 22 early in a list of shortcuts to be selected by the user. In this example, as the user personalized an association between gesture 8A and shortcut 24, the association between gesture 8A and shortcut 22, which was defined based at least in part on the user population, may be displayed after shortcut 24 in the shortcut result list.

A user may select the desired shortcut from a list of shortcuts presented by computing device 2A to the user (e.g., using presence sensitive screen 4A). Upon selection by the user, computing device 2A may perform the action specified by the shortcut, for example opening a web browser to a specified address or activating a program. Computing device 2A may record the selection of the shortcut, creating a locally stored association of gesture 8A with the selected shortcut. Computing device 2A may transmit data indicating that the user selected shortcut in response to gesture 8A to server 12. Server 12 may update usage history stored in database 14 and, aggregated over the user population, use the association data transmitted to server 12 by computing devices 2 to continue to develop the gesture language by, for example, updating gesture-shortcut associations and adding new gestures or shortcuts based at least in part on the aggregated usage patterns.

Computing device 2A may form the associations between gestures and shortcuts made by the user in a user customized dictionary that supplements the gesture language developed collaboratively by the user population on server 12.

In some examples, computing device 2A may display a gesture associated with a particular shortcut as defined by the collaboratively gesture-based language. For example, both shortcuts 10 and 12 are shown with a gesture similar but not identical to gesture 8A. The gestures shown with shortcuts 10 and 12 may be gestures commonly associated with the shortcuts by the user population and mapped to the shortcuts in the gesture-based language. Displaying gestures associated with the shortcut by the gesture-based language facilitates a user learning the gesture language through the normal course of interaction with computing device 2A.

In some examples, computing device 2A may also display text entry field 20, enabling a user to manually enter an address or shortcut (e.g., using a virtual keyboard). Manually entering the desired shortcut may be appropriate if, for example, the user was unsure of the gesture mapped to a desired shortcut or the desired shortcut was not displayed after inputting gesture 8A into computing device 2A. Computing device 2A may display one or more shortcuts associated with the manually entered shortcut or allow the user to specify a customized gesture to associate with the shortcut.

Figure 3:
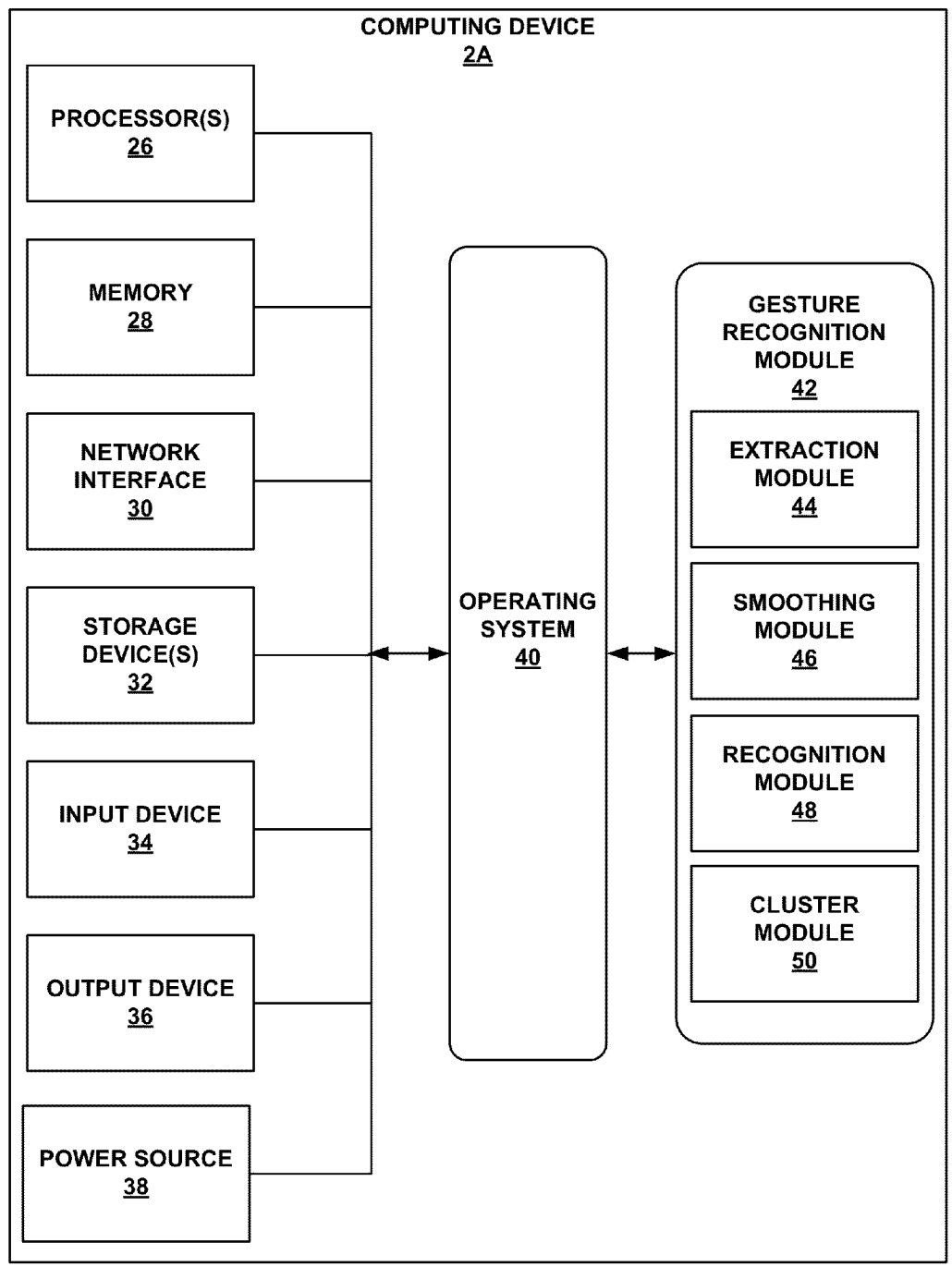
FIG. 3 is a block diagram illustrating an example computing device that utilizes gestures for control of computing device shown in FIG. 1, in accordance with one or more aspects of the present disclosure.

FIG. 3 is a block diagram illustrating an example computing device 2A that utilizes gestures for control of computing device shown in FIG. 1, in accordance with one or more aspects of the present disclosure. FIG. 3 illustrates only one particular example of client device 2A, and many other example embodiments of client device 2A may be used in other instances.

As shown in FIG. 3, computing device 2A includes Gesture Recognition Module (GRM) 42, operating system 40, one or more processors 26, memory 28, a network interface 30, one or more storage devices 32, input device 34, output device 36, and power source 38. Operating system 40 and GRM 42 are executable by one or more components of computing device 2A. Each of components 26, 28, 30, 32, 34, 36, and 38 may be interconnected (physically, communicatively, and/or operatively) for inter-component communications. In some examples, one or more of modules 42, 44, 46, 48, and 50 may be part of the same module. In some examples, one or more of modules 42, 44, 46, 48, and 50, and one or more processors 26 may be formed in a common hardware unit. In certain examples, one or more of modules 42, 44, 46, 48, and 50 may be software and/or firmware units that are executed on or operable by one or more processors 26.

Processors 26, in one example, are configured to implement functionality and/or process instructions for execution within computing device 2A. For example, processors 26 may be capable of processing instructions stored in memory 28 or instructions stored on storage devices 32. Such instructions may include components of operating system 40, GRM 42, or one or more modules of GRM 42.

Memory 28, in one example, is configured to store information within computing device 2A during operation. Memory 28, in some examples, is described as a computer-readable storage medium. In some examples, memory 28 is a temporary memory, meaning that a primary purpose of memory 28 is not long-term storage. Memory 28, in some examples, is described as a volatile memory, meaning that memory 28 does not maintain stored contents when the computer is turned off. Examples of volatile memories include random access memories (RAM), dynamic random access memories (DRAM), static random access memories (SRAM), and other forms of volatile memories known in the art. In some examples, memory 28 is used to store program instructions for execution by processors 26. Memory 28, in one example, is used by software or applications running on computing device 2A (e.g., operating system 40 and GRM 42) to temporarily store information during program execution.

Storage devices 32, in some examples, also include one or more computer-readable storage media. Storage devices 32 may be configured to store larger amounts of information than memory 28. Storage devices 32 may further be configured for long-term storage of information. In some examples, storage devices 32 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2A, in some examples, also includes a network interface 30. Computing device 2A, in one example, utilizes network interface 30 to communicate with external devices (e.g., server 12) via one or more networks, such as one or more wireless networks. Network interface 30 may be a network interface card (such as an Ethernet card, an optical transceiver, a radio frequency transceiver, or any other type of device that can send and receive information). Other examples of such network interfaces may include Bluetooth®, 3G and WiFi® radios in mobile computing devices as well as USB.

Computing device 2A also includes one or more input devices 34. Input device 34, in some examples, is configured to receive input from a user through touch or other gesture input. Examples of input device 34 include a presence-sensitive screen (e.g., presence-sensitive screen 4A shown in FIG. 2) such as touch-screen or track pad. One or more output devices 36 may also be included in computing device 2A. Output device 36, in some examples, is configured to provide output to a user using tactile, audio, or visual stimuli. Output device 36, in one example, includes a presence-sensitive screen (e.g., presence-sensitive screen 4A shown in FIG. 2), sound card, a video graphics adapter card, or any other type of device for converting a signal into an appropriate form understandable to humans or machines. Additional examples of output device 36 include a speaker, a cathode ray tube (CRT) monitor, a liquid crystal display (LCD), or any other type of device that can generate intelligible output to a user.

Computing device 2A, in some examples, may include one or more power sources 38, which may be rechargeable and provide power to computing device 2A. Power source 38, in some examples, may include batteries made from nickel-cadmium, lithium-ion, or other suitable material.

Computing device 2A may include operating system 40. Operating system 40, in some examples, controls the operation of components of computing device 2A. For example, operating system 40, in one example, facilitates the interaction of GRM 42 with processors 26, memory 28, network interface 30, storage device 38, input device 34, and output device 36.

Any applications or software modules (e.g., GRM 42) implemented within or executed by computing device 2A may be implemented or contained within, operable by, executed by, and/or be operatively/communicatively coupled to components of computing device 2A, such as processors 26, memory 28, network interface 30, storage devices 32, input device 34, and/or output device 36.

Computing device 2A may use GRM 42 to identify gesture 8A of FIG. 2 detected by input device 34 (e.g., presence sensitive screen 4A of computing device 2A of FIG. 2). GRM 42 may decompose an image of gesture 8A into major features, prepare data or images representative of the features of gesture 8A for comparison, and compare the data or images representative of gesture 8A with known gestures. In some examples, GRM 42 may identify one or more shortcuts associated with the identified gesture and expand a database of known gestures and associations to include identified gesture 8A. GRM 42 may include extraction module 44, smoothing module 46, recognition module 48, and cluster module 50.

Extraction module 44 of GRM 42 may spatially sample an image of gesture 8A. Spatial sampling may include forming a matrix or other representation of the image of gesture 8A using pixel values selected according to the position of the pixels within the image of gesture 8A. For example, extraction module 44 may be configured to decompose an image of gesture 8A into a series of feature images indicating the degree of orientation of a stroke forming gesture 8A with a particular direction (e.g., measuring how close to horizontal, vertical or diagonal a stroke of gesture 8A is) by spatially sampling over the image of gesture 8A. Extraction module 44 may also be configured to scale, rotate, and translate gesture 8A to compensate for variations in orientation, position, and size as gesture 8A was drawn on computing device 2A. For example, extraction module 44 may normalize gesture 8A about the center of mass of gesture 8A (center of mass may measure the center of the image of gesture 8A, for example, via the average position of all pixels forming gesture 8A, an intensity weighted average of the image of gesture 8A, or another process of measure), set the origin of gesture 8A to the center of mass, and scale gesture 8A such that the image of gesture 8A to a predefined width and height that corresponds with the size of images of known gestures.

Smoothing module 46 of GRM 42 may apply a smoothing function, such as a Gaussian smoothing function, to each image of the features of gesture 8A. Smoothing the images may reduce the sensitivity of the identification of gesture 8A to noise or small variations in the drawing of gesture 8A. Smoothing module 46 may downsample the feature images. For example, smoothing module 46 may apply a filter that reduces the number of pixels in the downsampled image by representing a series of subsets of pixels of the smoothed image with a statistic, such as the mean or maximum. Smoothing module 46 may subdivide the smoothed image into squares of four contiguous pixels, where each pixel of the downsampled image is the maximum value of the corresponding four pixel square of the smoothed image. Downsampling may speed comparison by reducing the number of data points (pixels) to compare with known images. Downsampling may also further reduce the sensitivity of the gesture comparison to minor variations in drawing gesture 8A.

Recognition module 48 may compare the feature images of gesture 8A to feature images of known gestures to determine whether a known gesture corresponds to gesture 8A. In some examples, recognition module 48 may apply a deformable template matching algorithm to the feature images of gesture 8A. This may allow each point in the feature images of gesture 8A to shift the known gesture feature image to form the best match. The range of the shift may be limited to speed comparison (e.g., allowing each point to shift a maximum of 3 pixels from the corresponding location on the feature images of the known gesture). To reduce overfitting, the shift may take local context into account by shifting and matching a patch surrounding a point rather than just the point. Agreement between the feature images of the detected gesture and known gesture may be represented by the image deformation model distance, computed as the sum of squared differences between the feature images at the respective patch locations. Upon identification of gesture 8A, recognition module 48 may retrieve one or more shortcuts corresponding to gesture 8A in a database stored in, for example, storage device 32. The retrieved shortcuts may be presented to a user via output device 36.

Cluster module 50 may accelerate the identification of gesture 8A by reducing the number of known gestures that recognition module 48 compares with gesture 8A. Known gestures may be arranged in a hierarchy, e.g., a parent-child clustered hierarchy. Cluster module 50 may select known gestures for comparison by recognition module 48 based at least in part on the distance between the feature images of gesture 8A and the known images. Cluster module 50 may progress through the hierarchy, eliminating dissimilar clusters of known gestures from comparison based at least in part on the output of recognition module 48. gesture 8A may be identified once cluster module 50 proceeds through the cluster hierarchy such that there are no more child clusters available, only the known gestures which form the clusters. In some examples, cluster module 50 may add gesture 8A to a cluster, provided that gesture 8A is similar to the other gestures in the cluster but not dissimilar enough to warrant forming a new cluster, either independent of the current gesture clusters or as a child cluster of a current gesture cluster. Cluster module 50 may store the clustered hierarchy of known gestures in a database or similar file structure in storage device 32. In some examples, cluster module 50 may also store shortcuts associated with the gestures by a user of computing device 2A in the gesture entry in the clustered hierarchy or in a different index or database containing mapped gestures and shortcuts.

Figure 4:
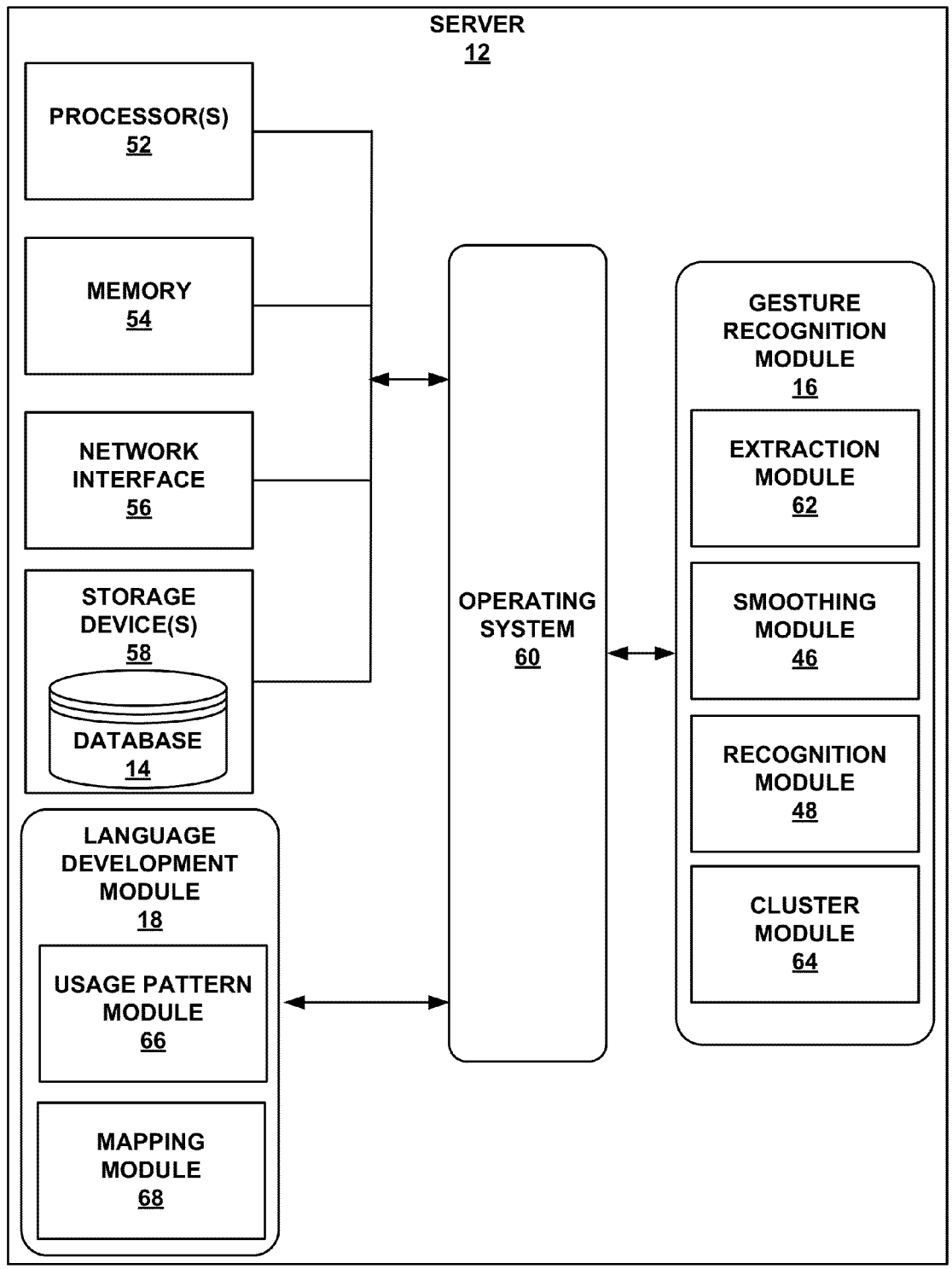
FIG. 4 is a block diagram illustrating example server that utilizes and develops a collaborative gesture language for control of computing device shown in FIG. 1, in accordance with one or more aspects of the present disclosure.

FIG. 4 is a block diagram illustrating example server 12 that utilizes and develops a collaborative gesture language for control of computing device 2A shown in FIG. 1, in accordance with one or more aspects of the present disclosure. FIG. 4 illustrates only one particular example of server 12, and many other example embodiments of server 12 may be used in other instances.

As shown in FIG. 4, server 12 may include Language Development Module (LDM) 56, Gesture Recognition Module (GRM) 64, operating system 63, one or more processors 52, memory 54, a network interface 56, and one or more storage devices 58. Operating system 60 and GRM 16 are executable by one or more components of server 12. Each of components 48, 50, 52, and 54 may be interconnected (physically, communicatively, and/or operatively) for inter-component communications.

One or more processors 52 may include, in certain examples, any one or more of a microprocessor, a controller, a digital signal processor (DSP), an application specific integrated circuit (ASIC), a field-programmable gate array (FPGA), or equivalent discrete or integrated logic circuitry. Processors 52, in one example, are configured to implement functionality and/or process instructions for execution within server 12. For example, processors 52 may be capable of processing instructions stored in memory 54 or storage devices 58.

Memory 54, in one example, is configured to store information within server 12 during operation. Memory 54, in some examples, is described as a computer-readable storage medium. In some examples, memory 54 is a temporary memory, meaning that a primary purpose of memory 54 is not long-term storage. Memory 54, in some examples, is described as a volatile memory, meaning that memory 54 does not maintain stored contents when the computer is turned off. Examples of volatile memories include random access memories (RAM), dynamic random access memories (DRAM), static random access memories (SRAM), and other forms of volatile memories known in the art. In some examples, memory 54 is used to store program instructions for execution by processors 52. Memory 54, in one example, is used by software or applications running on server 12 (e.g., operating system 60, LDM 18, and GRM 16) to temporarily store information during program execution.

Storage devices 58, in some examples, also include one or more computer-readable storage media. Storage devices 58 may be configured to store larger amounts of information than memory 54. Storage devices 58 may further be configured for long-term storage of information. In some examples, storage devices 58 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. Storage device 58 may include database 14 (FIG. 1), that stores definitions of a gesture-based language developed by server 12 with data aggregated from the user population of computing devices 2.

Server 12 also includes a network interface 56. Server 12, in one example, utilizes network interface 56 to communicate with multiple computing devices, e.g., computing device 2A (FIGS. 1 and 2), via one or more networks, e.g., network 10. Network interface 56 may be a network interface card (such as an Ethernet card, an optical transceiver, a radio frequency transceiver, or any other type of device that can send and receive information).

Server 12 may include operating system 60. Operating system 60, in some examples, controls the operation of the components of server 12. For example, operating system 60 may coordinate the interaction of GRM 16, LDM 18, processor 52, memory 54, network interface 56, and storage device 58. Any software or hardware modules, e.g., operating system 60, GRM 16, and LDM 18, implemented within or executed by server 12 may be implemented or contained within, operable by, executed by, and/or be operatively/communicatively coupled to components of server 12, e.g., processors 52, memory 54, network interface 56, storage devices 58.

GRM 16 may include extraction module 62, smoothing module 46, recognition module 48, and cluster module 64. In some examples, server 12 may receive, via network interface 56, an image of a detected gesture (e.g., gesture 8A of FIG. 1) from one of a plurality of computing devices, such as computing device 2A of FIG. 1. Server 12 may call GRM 16 to identify the received gesture. Extraction module 62 may decompose the image of the received gesture into one or more feature images, images emphasizing various standard characteristics of a gesture. Feature images may include representations of the vertical, horizontal, or diagonal strokes contained within the image of the received gesture. The feature images of the received gesture may be passed to smoothing module 46 and recognition module 48 for further processing as described previously with respect to FIG. 3. In other examples, server 12 may receive preprocessed feature images of the detected gesture from computing device 2A, allowing server 12 to bypass extraction module 62, and, in some examples, smoothing module 46 and to proceed with identification by recognition module 48.

Cluster module 64 may accelerate identification of the received gesture by progressing though a clustered hierarchy of known gestures. Cluster module 64 may retrieve representative feature images characteristic of known clusters of gestures within a particular cluster for comparison by recognition module 48. As clusters of gestures are discarded as insufficient matches to the received gesture, cluster module 64 may progress down a parent child hierarchy into sub clusters of known gestures and eventually into providing feature images of known gestures themselves for comparison. As the distinction between known gestures becomes finer (e.g., the known gestures are grouped in similar or the same clusters) smoothing module 46 may reduce downsampling and recognition module 48 may perform the image comparison between the received and known gestures over more data points. This may increase accuracy at the expense of computation time. Cluster module 64 may store received gesture 8A in the clustered hierarchy, for example, in a database or index maintained in storage device 58. In some examples, cluster module 64 may remove disused gestures and gestures from the clustered gesture hierarchy.

Server 12 may include LDM 18. LDM 18 may include Usage Pattern Module (UPM) 66 and mapping module 68. LDM 18 may define a gesture language using gesture and shortcut data aggregated from the user population of computing devices 2. Server 12 may identify gesture 8A detected on computing device 2A, via recognition module 48, and return one or more shortcuts associated with the identified received gesture to computing device 2A. Computing device 2A may transmit to server 12 a shortcut selected by the user of computing device 2A as associated with gesture 8A. In other examples, server 12 may receive the identification of gesture 8A, along with shortcut information associated with gesture 8A, from computing device 2A. LDM 18 may aggregate the usage data of gestures 8A and user associated shortcuts in storage device 58, analyze the usage data, and define gesture-shortcut mappings to form a gesture-based language. This gesture-based language may be stored as a database or index in storage device 58. All or a portion of the gesture-shortcut mappings may be transmitted to computing devices 2, enabling computing devices 2 to utilize the gesture language without connection to server 12.

UPM 66 may analyze the pattern of use of gestures and shortcuts among the user population. Usage patterns may include frequency of an association between a particular gesture and shortcut, frequency of such an association over time, time since last association between a gesture and shortcut, number of times a gesture and shortcut are associated, and similar metrics. For example, UPM 66 may identify one or more shortcuts most frequently associated with a particular gesture by the user population. The gesture-based language may define that particular gesture as representing the one or more identified shortcuts. Over time, the usage of the particular gesture may shift, coming to be more frequently used to represent a different set of shortcuts. UPM 66 may identify the declining usage of the prior definition in the gesture-based language and redefine the gesture to reflect the more common new usage within the user population. Depending on usage, multiple gestures and shortcuts may be associated together.

Mapping module 68 may store one or more associations between a gesture and a shortcut in a database, e.g., database 14, in storage device 58. These associations may be determined by UPM 66 and form a gesture-based language for computing devices 2. User customized associations between gestures and shortcuts may also be stored in database 14 or some other location in storage device 58. For example, a user may create one or more gestures or associations between a gesture and a shortcut unique to the individual user. Computing device 2A may transmit the customized gesture or gesture-shortcut association to server 12. Server 12 may retain a copy of the customized gesture in the gesture clustered hierarchy and may store a copy of the unique gesture-shortcut association. The unique association may be used by recognition module 48 to identify a shortcut with the gesture or by server 12 to reload computing device 2A with the customized associations of a user if necessary, for example during computing device migration.

Although shown as separate components in FIG. 4, in some examples, one or more of modules 16, 18, 46, 48, 62, 64, 66, and 68 may be part of the same module. In some examples, one or more of modules 16, 18, 46, 48, 62, 64, 66, and 68, and one or more processors 52 may be formed in a common hardware unit. In certain examples, one or more of modules 16, 18, 46, 48, 62, 64, 66, and 68 may be software and/or firmware units that are executed on or operable by one or more processors 52.

Figure 5:
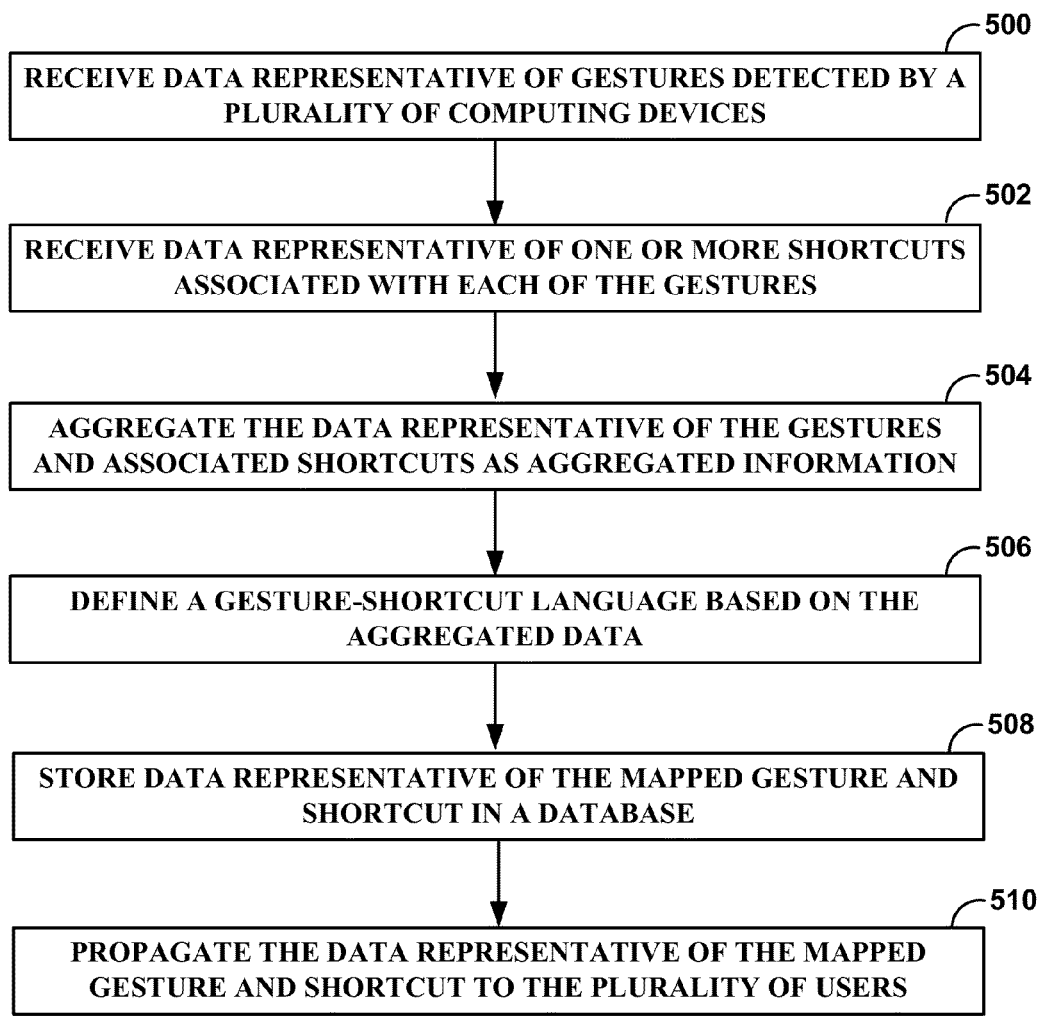
FIG. 5 is a flowchart illustrating an example process for collaboratively developing a gesture language for control of the computing device shown in FIG. 1, in accordance with one or more aspects of the present disclosure.

FIG. 5 is a flowchart illustrating an example process for collaboratively developing a gesture language for control of computing device 2A shown in FIG. 1, in accordance with one or more aspects of the present disclosure. For purposes of illustration only, the example process is described below within the context of server 12 of FIGS. 1 and 4 and computing device 2A of FIGS. 1 and 3. However, the example process of FIG. 5 may be performed using other devices.

Server 12 may receive data representative of gestures detected by a plurality of computing devices 2 (500). Computing devices 2 of the user population may transmit images or data representative of gestures 8A to server 12 for identification or gesture-based language development. Data representative of a detected gesture may include an image of the detected gesture or images of features of the detected gesture. For example, computing device 2A may decompose an image of the detected gesture in feature images of the strokes of the gesture directed along various axes, such as a series of images showing the horizontal, vertical, and diagonal strokes that form the gesture. In other examples, computing device 2A may locally identify the detected gesture and transmit an identification of the detected gesture for processing by LDM 18 of server 12. The identification or images of the detected gesture may be cached in memory 54 of server 12 for further processing by one or more modules or components of server 12.

Server 12 may receive data representative of one or more shortcuts associated with each of the gestures (502). In some examples, computing devices 2 may further transmit data representative of a shortcut selected by a user of a computing device 2A after inputting or creating a gesture. Server 12, through network interface 56 and network 10, may receive this data and store the data in memory 54 for processing or place the data in long term storage in storage device 58. Customized gestures and gesture-shortcut associations may be stored in storage device 58 in database 14 or some other form of index or database accessible by other components and modules of server 12, such as GRM 16, to be retrieved and used to identify gestures detected on the originating computing device or to allow a user of the originating computing device to restore or migrate the customized gesture-shortcut associations the user developed.

Server 12 may aggregate the data representative of the gestures and associated shortcuts as aggregated information (504). Aggregating the data may include identifying received gestures from one or more computing devices 2 of the user population with GRM 16, associating these identified gestures with user selected shortcuts (received from computing devices 2), and storing the resultant associations. This history of association may be placed in long term memory, such as storage device 58. The aggregated data may also include customized and locally identified gesture-shortcut associations received from the computing devices 2 of the user population.

UPM 66 of LDM 18 of server 12 may define a gesture-shortcut language based at least in part on the aggregated data (506) by analyzing the usage patterns of gesture-shortcut associations in aggregated data. The gesture-shortcut language may be based at least in part on a usage statistic, such as the frequency a particular gesture-shortcut association occurs in the data aggregated over the user population. A gesture frequently associated with a particular shortcut by the user population may be defined by UDM 58 as a gesture-shortcut association. In some examples, particular gesture may be frequently associated with multiple shortcuts by various segments of the user population. UDM 58 may store such a gesture with a plural definition, allowing the gesture to represent multiple shortcuts and allowing multiple shortcuts to be returned to a computing device 2A when the particular gesture is identified for the computing device.

UDM 58 may also store multiple gestures representing the same shortcut. UPM 66 may track one or more usage statistics to develop the gesture-based language over time, adjusting the gesture-shortcut definitions as usage changes or new gestures or shortcuts are developed by the user population. As gesture-shortcut associations fall into disuse, UPM 66 may detect these outmoded gesture-shortcut associations by, for example, monitoring time elapsed since last association by the user population or monitoring the frequency of association over time and discard them. UPM 66 may also edit one or more databases of gesture cluster hierarchies, removing infrequently used gestures or gesture clusters, reducing memory requirements for storage and reducing identification times of received detected gestures in GRM 16 by avoiding comparisons to disused gestures.

Sever 12, in a database (e.g., database 14) in storage device 58, may store data representative of the mapped gesture and shortcut in a database (508) such as the gesture-shortcut associations. Mapping module 68 of LDM 18 may cause processor 52 to store the data representative of the gesture-shortcut association in database 14 accessible to GRM 16 to allow identification of one or more gestures 8A received from computing devices 2. Mapping module 68 and cluster module 64, alone or in conjunction, may store data representative of a detected gesture in a gesture cluster hierarchy in storage device 58.

Server 12 may propagate the data representative of the mapped gesture and shortcut to the plurality of users (510) by transmitting all or a subset of the gesture-shortcut associations forming the gesture-based language developed by LDM 18 of server 12 to computing devices 2 of the user population via network 10. Server 12 may also transmit portions of the clustered gesture hierarchy corresponding to the transmitted gesture-based language to computing devices 2. Computing devices 2 may utilize the transmitted gesture-based language and clustered hierarchy to perform identifications of detected gestures and retrieve shortcuts associated with the identified gestures locally on computing devices 2.

Figure 6:
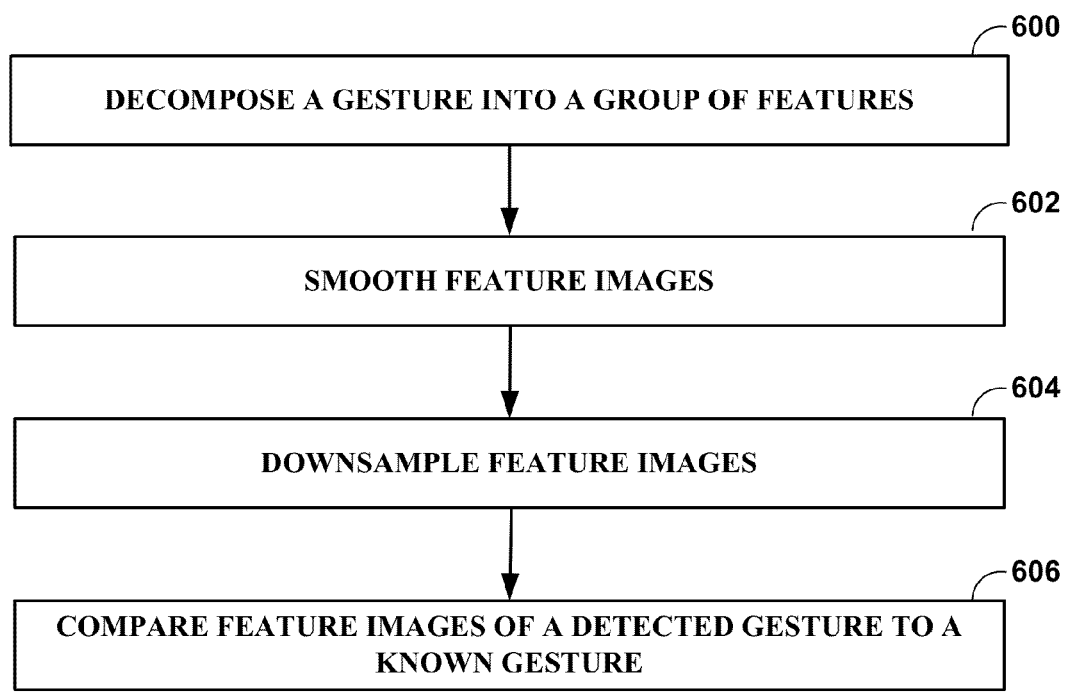
FIG. 6 is a flowchart illustrating an example process for processing an image of gesture, in accordance with one or more aspects of the present disclosure.

FIG. 6 is a flowchart illustrating an example process for processing an image of gesture 8A. For purposes of illustration only, the example process is described below within the context of GRM 16 of server 12 of FIG. 4 and GRM 42 of computing device 2A of FIG. 3. However, the example process of FIG. 6 may be performed using other devices.

Extraction module 44 of GRM 42 of computing device 2A (FIG. 3) or extraction module 62 of GRM 16 of server 12 (FIG. 4) may decompose an image of a detected gesture (600). Decomposing an image of a detected gesture may include processing the image in preparation for comparison and extracting one or more features of the gesture captured in the image. The initial image of gesture 8A may be scaled to aid in comparison, for example stretching or shrinking the image so that the height and width of the detected gesture is one standard deviation in each direction. Another method to scale gesture 8A is to use a bounding box, fitting the image into a set frame size. The image may also be translated, which may include positioning the image of the detected gesture around the center of mass of the strokes that form the detected gesture.

GRM 42 or 64 may resolve gesture 8A into one or more feature images corresponding to the features of the strokes which form gesture 8A, breaking the image of gesture 8A apart such that each feature image shows the strokes in the image of gesture 8A corresponding to a particular direction (e.g., horizontal, vertical, and diagonal). For example, a feature image may show all horizontal strokes in gesture 8A, while another feature image shows all vertical strokes that compose gesture 8A. A third and fourth feature image may show diagonal strokes of the detected gesture. A fifth feature image may represent the beginning and end points of the strokes that form gesture 8A. Some gestures, such as the numbers "3" and "8", have relatively similar shapes and strokes. The typical start and end points of the strokes that form the "3" and "8" are different. A "3" is typically drawn starting near the top and progressing down, finishing near the bottom of the symbol. A stroke forming an "8" is likely to both begin and end near the top of symbol. While the feature images of a "3" and "8" are likely to show similar horizontal, vertical, and diagonal strokes, the start and end points may provide sufficient distinction to differentiate the gestures.

Smoothing module 46 of GRM 42 and/or 64 may apply a smoothing function in order to smooth the feature images (602) by, for example, applying a Gaussian smoothing function to the feature images of gesture 8A. Smoothing module 46 of GRM 42 and/or 64 may also downsample feature images (604) to further reduce the sensitivity of the feature images to noise. Downsampling the featured images may reduce the number of data points (pixels) in each of the featured images by computing a statistic (such as the min, max, mean, etc.), for a moving window of pixels. In one example, smoothing module 46 may apply a 3×3 moving window to each feature image. Each data point in the down sampled image may correspond to the maximum value of the pixels in the corresponding 3×3 section of the feature image. As GRM 42 or 64 compares gesture 8A to increasingly similar known gestures, e.g., as the identification algorithm progresses through the clustered gesture hierarchy, downsampling may be reduced or eliminated, allowing fine features of a gesture obscured by downsampling to affect the identification of gesture 8A.

Recognition module 48 of computing device 2A or server 12 may compare feature images of a detected gesture to a known gesture (606), for example, by comparing feature images of gesture 8A to feature images of a known gesture. Data representative of a known gesture, such as feature images, may be stored in storage device 58 of server 12 or storage device 32 of computing device 2A. Recognition module 48 of GRM 42 or 64 may compute an image deformation model distance for the comparison of the detected and known gesture. Recognition module 48 may calculate the distance between a patch of the feature images and the best matching area of the known gesture feature images. Recognition module 48 may limit the search for the best match to the corresponding area of the known gesture feature image. For example, recognition module 48 may limit the match algorithm to an examination of the region on the known gesture feature image within a fixed distance of the location corresponding to the patch location on the detected gesture feature image. To determine the strength of the match between the known and detected gesture, recognition module 48 may sum, over the known gesture image, the sum of the squared differences between the detected and known gesture feature images at the matched patch locations.

Recognition module 48 may progress through a clustered gesture hierarchy, reducing the number of comparisons that are made to dissimilar known gestures as dissimilar gestures are eliminated before comparison due to their position in s discarded cluster. For example, a cluster that is found to be dissimilar from gesture 8A by recognition module 48 may be removed from comparison, along with all of the children gestures and gesture clusters that form the discarded gesture cluster. Cluster module 64 or 46, of server 12 and computing device 2A respectively, may maintain the clustered gesture hierarchy in storage device 58 or 28.

Figure 7:
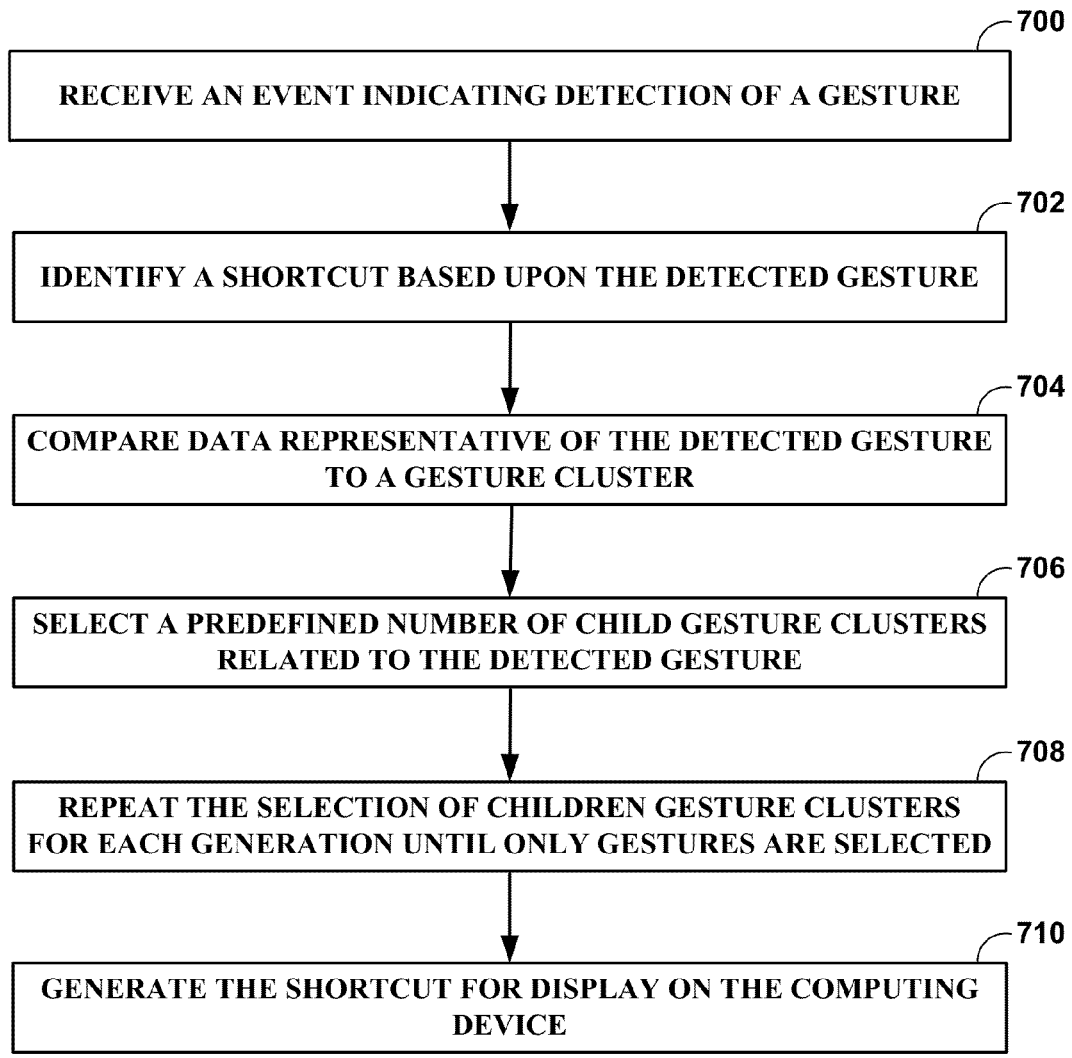
FIG. 7 is a flow chart illustrating an example process for analyzing a gesture detected by the computing device shown in FIG. 1, in accordance with one or more aspects of the present disclosure.

FIG. 7 is a flow chart illustrating an example process for analyzing a gesture detected by computing device 2A shown in FIG. 1, in accordance with one or more aspects of the present disclosure. For purposes of illustration only, the example process is described below within the context of server 12 of FIGS. 2 and 4 and computing device 2A of FIGS. 2 and 3. However, the example process of FIG. 7 may be performed using other devices.

Computing device 2A may receive an event indicating detection of a gesture (700),e.g., detecting gesture 8A (FIG. 2) via input device 34 (FIG. 3) of computing device 2A. Input device 34, for example presence sensitive screen 4A (FIG. 2), may store gesture 8A in memory 28 of computing device 2A (FIG. 3) for processing. Gesture 8A may be stored as an image and may be accompanied by associated data, such as the locations of stroke start and end points. Multiple strokes may form gesture 8A and these strokes need not be continuous.

GRM 42 of computing device 2A or GRM 16 of server 12 may identify a shortcut based at least in part upon the detected gesture (702) by comparing an image or data representative of a gesture 8A to images or data representative of known gestures. GRM 42 may retrieve the image and associated data of gesture 8A from memory 28 and process the image for identification. GRM 42, using extraction module 44, may decompose the image of gesture 8A into a series of feature images representing the characteristics of the strokes that form gesture 8A. Smoothing module 46 may apply a smoothing function to the feature images to reduce the effect of minor errors in inputting or capturing gesture 8A. In some examples, one or more of these steps may be performed remotely from computing device 2A on server 12. Computing device 2A may transmit data representative of gesture 8A, such as an image or set of feature images of gesture 8A, to server 12 for identification and may receive an identification of gesture 8A and/or a one or more shortcuts represented by the identified gesture 8A.

Recognition module 48 of computing device 2A or server 12 may compare data representative of the detected gesture to a gesture cluster (704) by comparing the feature images of gesture 8A to the feature images of a known gesture using recognition module 48. Recognition module 48 may compare portions of the smoothed and downsampled feature images of the detected gesture with feature images of known gesture found in the clustered gesture hierarchy as discussed above with respect to FIGS. 5 and 6. In some examples, comparison may take place on computing device 2A, e.g., using GRM 42, while in other examples comparison may be performed on server 12 or at both locations in parallel.

Cluster module 50 of computing device 2A (FIG. 3) or cluster module 64 of server 12 (FIG. 4) may select a predefined number of child gesture clusters related to the detected gesture (706). Cluster module 50 or 64 may first supply recognition module 48 with data representative of the gestures in the top-level, e.g., largest, clusters. Cluster module 50 or 64 and recognition module 48 may then select a predefined number of the closest child clusters of the top-level clusters for comparison.

Cluster module 50 or 64 may repeat the selection of children gesture clusters for each generation until only gestures are selected (708) continuing the selection and comparison cycle of step 706 until no gesture clusters are available for selection. As cluster module 50 or 64 and recognition module 48 progress through the clustered gesture hierarchy, eventually the cluster modules will be unable to retrieve further child cluster gestures. Cluster module 50 or 64 may retrieve data representative of the known gestures with the last cluster for comparison by recognition module 48 to identify gesture 8A.

Computing device 2A, e.g., through output device 36 (FIG. 3), may generate the shortcut for display on the computing device (710), for example, output device 36 may display one or more shortcuts, such as shortcuts 10 and 12 (FIG. 2). Output device 36 may include presence sensitive screen 4A of computing device 2A (FIG. 2). The identified gesture 8A may be associated with one more shortcuts through a gesture-based language. Definitions for the gesture-based language may be stored in one or more databases or indexes, such as database 14 of server 12, that are remotely and/or locally accessible. In some examples, computing device 2A may have a locally stored user customized list of gesture-shortcut associations. These gesture-shortcut associations may be independent of the gesture-based language. Computing device 2A may display both shortcuts selected via the user customized list of gesture-shortcut associations and gesture-shortcut associations defined by the gesture-based language. In some examples, computing device 2A may receive data representative of one or more associated shortcuts from a remote location, such as server 12.

Computing device 2A may display the shortcuts associated with the identified gesture 8A in a list format, allowing a user of computing device 2A to select the desired shortcut. Computing device 2A may transmit information relating to the selection to server 12, allowing server 12 to update usage history for the shortcut and gesture and contribute to the aggregated usage history data that LDM 18 of server 12 (FIG. 4) may use to continue development of the gesture-based language.

FIGS. 8A-8D are diagrams illustrating a text-based query to an example gesture-based application installed on computing device 2A shown in FIG. 1, in accordance with one or more aspects of the present disclosure. A text-based query to the example gesture-based application may allow the user to retrieve and learn a gesture representing a desired shortcut.

Figure 8A:
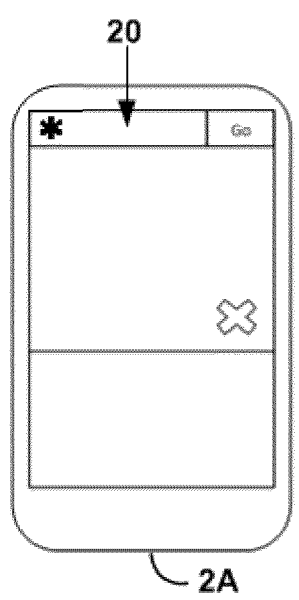
FIGS. 8A-8D are diagrams illustrating a text-based query for an example gesture-based application installed on the computing device shown in FIG. 1, in accordance with one or more aspects of the present disclosure.

FIG. 8A shows computing device 2A displaying a gesture-based application. If a user is unsure of the gesture associated with a desired action or shortcut, the user may enter a text based query into text entry field 20 of computing device 2A to cause computing device 2A to search for and display a desired shortcut and gesture. The user may select text entry field 20, via by tapping or otherwise indicating the selection on presence sensitive screen 4A of computing device 2A, to cause computing device 2A to activate text entry field 20.

Figure 8B:
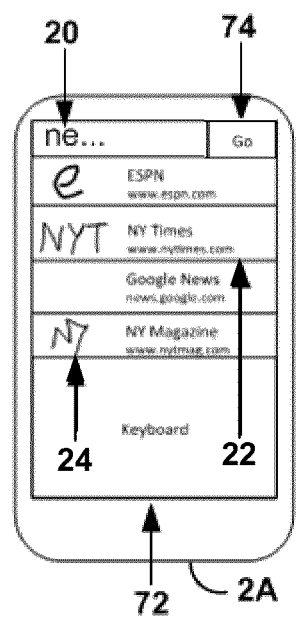

FIG. 8B shows a partially entered search string in text entry field 20 of computing device 2A, entered using virtual keyboard 72. "Go" button 74, when actuated (e.g., via tapping with a fingertip, stylus, or other method), commands computing device 2A to search either an onboard database of gesture-shortcut associations for shortcuts matching the search string in text entry field 20 and/or transmit the query to server 12 to consult a gesture language database maintained externally to computing device 2A. Computing device 2A and/or server 12 may match the search string dynamically, as the string is entered (e.g., performing a search on the partially entered search string as the string is being inputted into text entry field 20). Computing device 2A may display any partial matches from the user's browser history or prior usage of computing device 2A in a list view below text entry field 20 (e.g., shortcuts 10 and 12). These shortcuts may be displayed along with gestures associated with the shortcuts, allowing the user to learn the gestures to simplify access to the various webpages and applications.

Figure 8C:
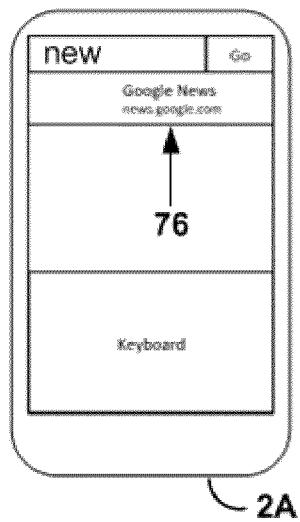

FIG. 8C shows an example where the shortcut returned by the search does not have a gesture associated with the shortcut. In some examples, a particularly shortcut may not have a gesture associated with it, such as shortcut 76 to "news.google.com". In other examples, a returned shortcut may have multiple gestures associated with the shortcut. In such instances computing device 2A may display a single gesture for the shortcut, for example, the gesture most commonly associated with the shortcut.

Figure 8D:
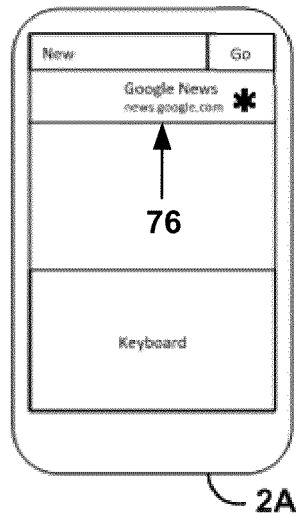

FIG. 8D shows how the user may select the correct shortcut from a list of results. Selecting shortcut 76, by tapping or otherwise indicating the selection on presence sensitive screen 4A of computing device 2A, may cause computing device 2A to launch a web browser to the selected shortcut location (here, opening a web browser to the website "www.google.com") or otherwise perform the action indicated by the selected shortcut.

FIGS. 9A-9D are diagrams illustrating a gesture-based query to an example gesture-based application installed on computing device 2A shown in FIG. 1, in accordance with one or more aspects of the present disclosure. Drawing a gesture may allow a user to avoid using more cumbersome input mechanisms to computing device 2A, such as soft keyboards.

Figure 9A:
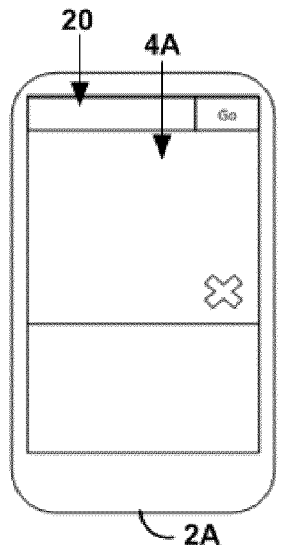
FIGS. 9A-9D are diagrams illustrating a gesture-based query for an example gesture-based application installed on the computing device shown in FIG. 1, in accordance with one or more aspects of the present disclosure.

FIG. 9A shows computing device 2A equipped with a presence sensitive screen 4A. Computing device 2A is showing a gesture-based application. A user may draw a gesture on presence sensitive screen 4A to cause computing device 2A or server 12 to search for one or more shortcuts associated with the gesture.

Figure 9B:
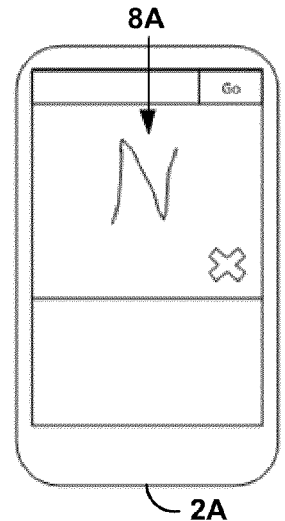

FIG. 9B shows a user drawn gesture 8A on presence sensitive screen 4A of computing device 2A instead of manually entering the desired shortcut in text entry field 20. Computing device 2A may analyze gesture 8A using GRM 42 of computing device 2A (FIG. 2) as discussed above. Computing device 2A may identify gesture 8A and use a gesture-based language to determine one or more shortcuts associated with identified gesture 8A. In some examples, gesture and/or shortcut identification may take place remotely from computing device 2A on server 12.

Figure 9C:
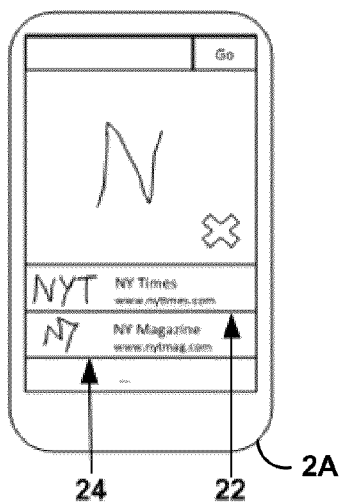

FIG. 9C shows the gesture-based application of computing device 2A displaying a list of shortcuts associated with gesture 8A. Computing device 2A may display the shortcuts of one or more gestures that most closely match the gesture 8A in, for example, a list view below gesture 8A. Some shortcuts may be associated with gesture 8A based at least in part on the gesture-based language (e.g. shortcut 22) while other shortcuts may be associated with gesture 8A through user customization of a gesture-shortcut relationship. Such a user customized association may be stored locally on computing device 2A (e.g., in storage device 32) or externally on server 12.

Figure 9D:
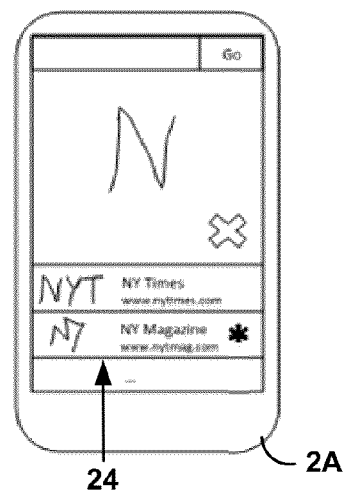

FIG. 9D shows the selection of the desired shortcut 24 corresponding to the inputted gesture, gesture 8A. The user may choose the desired shortcut from the list by tapping or otherwise indicating the selection, and computing device 2A may perform the action indicated by shortcut 24. Computing device 2A may transmit data representative of the selection of the desired shortcut to server 12, which may store the selection or update the usage history of the gesture and/or shortcut to reflect the selection. Server 12, using LDM 18, may continue to aggregate usage history data from across the user population to continue to develop the gesture-based language, propagating updated associations to computing devices 2.

FIGS. 10A-10D are diagrams illustrating a gesture-based query followed by a text-based query to an example gesture-based application installed on computing device 2A shown in FIG. 1, in accordance with one or more aspects of the present disclosure. In some situations a desired shortcut is not associated with a particular gesture, so a user may create a customize association between the entered gesture and the desired shortcut.

FIG. 10A shows a computing device 2A equipped with a gesture-based interface and a gesture, gesture 8A, inputted on presence sensitive screen 4A. A user may input gesture 8A into computing device 2A via presence sensitive screen 4A. Computing device 2A, or server 12 in some examples, may identify gesture 8A and present a list of shortcuts associated with identified gesture 8A to the user of computing device 2A, but the correct shortcut may not be displayed in the list of shortcuts 86. A user may activate text entry field 20, via tapping or other method of indicating selection, and begin entering text into text entry field 20.

FIG. 10B shows that computing device 2A may hide the drawing area and display inputted gesture 8A in a miniaturized version on the upper right 84. Computing device 2A may also display an expanded list of potential shortcuts 88 for selection by the user. The user may use an alternative input device, such as virtual keyboard 70, to input the desired shortcut, allowing computing device 2A to winnow the list of prospective shortcuts.

FIG. 10C shows partially entered search string in text entry field 20 of computing device 2A. Computing device 2A, independently or in conjunction with server 12, may search for shortcuts corresponding to the search string. The search may be performed dynamically, matching partially entered search strings as the search strings are entered into text entry field 20. One or more shortcuts, such as shortcut 92, may be presented to the user via output device 36 (e.g., presence sensitive screen 4A) for user selection.

FIG. 10D shows the selection of the desired shortcut. Selection of shortcut 92 causes computing device 2A to perform the action associated with the selected shortcut and may cause computing device 2A to learn the association between the inputted gesture 8A and the selected shortcut for future queries, storing the customized gesture-shortcut association in local memory (e.g., memory 28 of computing device 2A) for later recall. In some examples, computing device 2A may transmit the customized gesture-shortcut association to server 12 for backup and to be used in the continued development of the gesture-based language.

FIGS. 11A-11D are diagrams illustrating shortcut editing in an example gesture-based application installed on computing device 2A shown in FIG. 1, in accordance with one or more aspects of the present disclosure. A user may customize or define a new gesture to represent a shortcut.

FIG. 11A shows computing device 2A equipped with a gesture-based application. A user may search for a desired gesture-shortcut association by entering text, e.g., via virtual keyboard 70, in text entry field 20. Computing device 2A may display a list of potential shortcuts 86 matching the text query.

Selection of shortcut 94, by tapping or otherwise indicating the selection on presence sensitive screen 4A of computing device 2A, may cause computing device 2A to open a new window in the gesture-based application allowing a user to edit the gesture or gesture-shortcut association represented by shortcut 94.

FIG. 11B shows a gesture-based application configured to allow a user to edit a gesture. Computing device 2A may display one or more menus showing relevant data about the selected gesture-shortcut association, including the title of the shortcut 96 and URL the shortcut directs to 98. For example, computing device may display a variety of gestures, such as gestures 102, associated with the shortcut. One gesture (e.g., gesture 106) may be displayed in a darker color or otherwise set apart from the other gestures associated with the shortcut, indicating this gesture is most frequently associated with the shortcut by the user population. A user may elect to create a custom gesture for the shortcut by, for example, selecting Draw Your Own" button 100.

FIG. 11C shows a menu in a gesture-based application configured to allow a user to create a custom gesture for a particular shortcut. The user may input a gesture (e.g., gesture 106) that the user wishes to associate with the shortcut. Gesture 106 may be inputted by the user with a fingertip, stylus, or other tool on presence sensitive screen 4A. Upon entry of gesture 106, computing device 2A may store gesture 106 locally in computing device 2A (e.g., in memory 28).

FIG. 11D shows a gesture-based application of computing device 2A displaying a set of gestures associated with a particular shortcut, including gesture 106 (discussed in FIG. 11C). Computing device 2A may display the new gesture 106 among the other gestures associated with the shortcut (e.g., by displaying customized gesture 108). Computing device 2A may also transmit customized gesture 108, or data representative of customized gesture 108, to server 12 for backup and to continue development of the gesture-based language.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments have been described. These and other embodiments are within the scope of the following claims.

The invention claimed is:

1. A method comprising:
   storing, by the computing device and in a data repository of the computing device, at least a portion of an aggregated group of gesture-shortcut associations;
   receiving, by a computing device, data representative of a gesture detected by a presence-sensitive screen of the computing device;
   identifying, by the computing device and based at least in part on the data representative of the gesture, a first candidate shortcut by at least accessing the portion of the aggregated group of gesture-shortcut associations stored in the data repository;
   responsive to sending, by the computing device, the data representative of the gesture to a server, receiving, by the computing device and from the server, an indication of a second candidate shortcut associated with the gesture;
   selecting one of the first candidate shortcut and the second candidate shortcut as a shortcut associated with the gesture, wherein the shortcut associated with the gesture corresponds to an action to be performed by the computing device; and
   outputting, by the computing device, for display, data representative of the shortcut associated with the gesture.

2. The method of claim 1, wherein identifying the first candidate shortcut comprises:
   identifying, by the computing device, a letter associated with at least a portion of the gesture; and
   identifying, based at least in part on the letter, the first candidate shortcut.

3. The method of claim 1, wherein identifying the first candidate shortcut further comprises:
   identifying a first shortcut associated with the gesture based at least in part on detected similarities between the gesture and images of a group of image-shortcut associations;
   identifying a second shortcut associated with the gesture using handwriting recognition to identify at least one letter associated with the gesture; and
   selecting one of the first shortcut and the second shortcut as the first candidate shortcut.

4. The method of claim 1, further comprising:

selecting the first candidate shortcut as the shortcut associated with the gesture when the association between the gesture and the first candidate shortcut is configured by a user of the computing device.

5. The method of claim 1, wherein the aggregated group of gesture-shortcut associations includes a plurality of gesture clusters that each include a plurality of gestures each determined to have features that are less than a threshold amount different than the features of other gestures in the respective gesture cluster, and wherein the plurality of gesture clusters are organized in a hierarchy such that another threshold amount difference between features of the gestures included in the gesture cluster for a child gesture cluster is less than the threshold amount difference between features of the gestures included in the gesture cluster of the respective gesture cluster.

6. The method of claim 5, wherein the gesture includes a first group of features that define a shape of the gesture, and wherein identifying the first candidate shortcut further comprises:

determining whether the first group of features of the gesture is less than a threshold amount different than a second group of features of a respective gesture cluster of the plurality of gesture clusters.

7. The method of claim 6, further comprising:

responsive to determining that the first group of features is less than the threshold amount different than the second group of features:

responsive to determining that the respective gesture cluster has at least one child gesture cluster, recursively selecting a child gesture cluster of the at least one child cluster of the respective gesture cluster, and determining whether the first group of features of the gesture are less than another threshold amount different than a third group of features of the child gesture cluster; and responsive to determining that the respective gesture cluster does not have at least one child gesture cluster, identifying shortcuts associated with gestures included in the respective gesture cluster based at least in part on a mapping of each of the gestures included in the respective gesture cluster to a respective shortcut.

8. The method of claim 6, further comprising:

responsive to determining that the first group of features is not less than the threshold amount different than the second group of features:

responsive to determining that the respective gesture cluster has at least one sibling gesture cluster previously unanalyzed, recursively selecting a sibling gesture cluster of the at least one sibling gesture cluster, and determining whether the first group of features of the gesture are less than another threshold amount different than a group of features of the sibling gesture cluster;

responsive to determining that all of the sibling gestures of the respective gesture cluster were previously analyzed and at least one parent gesture cluster of the respective gesture has not been previously analyzed, selecting one of the parent gesture clusters that has not been previously analyzed, and analyzing the selected parent gesture cluster of the respective gesture cluster; and responsive to determining that all of the sibling gestures of the respective gesture cluster does were previously analyzed and all of the parent gesture clusters of the respective gesture have been previously analyzed, identifying shortcuts associated with gestures included in the parent gesture cluster based at least in part on a mapping of each of the gestures included in the parent gesture cluster to a shortcut.

9. The method of claim 1, further comprising:

associating, by the computing device and based at least in part on user input received by the computing device, a different shortcut with the gesture; and storing an indication of the association between the different shortcut and the gesture in the data repository of the computing device.

10. The method of claim 9, further comprising:

sending, by the computing device, an indication of the association between the different shortcut and the gesture to the server.

11. The method of claim 1, further comprising:

receiving, by the computing device, at least one text-based search term;

generating a query based at least in part on the at least one text-based search term;

executing the query to retrieve data associated with a group of shortcuts and associated gestures from the data repository of the computing device; and outputting, by the computing device, for display, a representation of the retrieved group of shortcuts and associated gestures.

12. The method of claim 1, further comprising:

when no shortcuts are associated with the gesture, receiving, by the computing device, a selection of the action to be performed by the computing device; and storing an association between the gesture and a shortcut to the selected action.

13. A method comprising:

receiving, by a server and from a plurality of computing devices, data representative of a group of gestures detected by the plurality of computing devices;

receiving, by the server, data representative of one or more shortcuts associated with the group of gestures from the plurality of computing devices, wherein each of the shortcuts corresponds to an action performed by at least one of the plurality of computing devices;

aggregating, by the server and based at least in part on detected similarities between at least one of 1) the group of gestures and 2) the one or more shortcuts associated with the group of gestures, the data representative of the group of gestures and the data representative of the associated shortcuts received from the plurality of computing devices into a plurality of gesture clusters organized into a generational hierarchy of parent and child gesture clusters such that each child gesture cluster of the generational hierarchy includes a plurality of gestures each determined to have features that are less than a first threshold amount different than corresponding features of gestures in a corresponding parent gesture cluster of the generational hierarchy;

defining, by the server, a gesture-shortcut language based at least in part on the aggregated data, wherein the gesture-shortcut language includes at least a portion of the aggregated data representative of the group of gestures and associated shortcuts;

receiving, by the server, data representative of a gesture detected at a presence-sensitive screen of a computing device from one of the plurality of computing devices;

comparing the data representative of the detected gesture to data representative of a parent gesture cluster from the plurality of gesture clusters;

repeating a selection of a child gesture cluster for each generation of gesture clusters until features of gestures included in the respective child gesture cluster are less than a second threshold amount different from corresponding features of the detected gesture;

identifying at least one shortcut associated with the selected child gesture cluster; and transmitting data representative of the at least one shortcut associated with the selected child gesture cluster to the computing device.

14. The method of claim 13, further comprising:
sending a portion of the gesture-shortcut language based at least in part on the aggregated data to at least one computing device of the plurality of computing devices.

15. The method of claim 13, further comprising:
storing data representative of the group of gestures, the shortcuts, and a set of gesture-shortcut associations in a data repository of the server; and transmitting, by the server, at least a portion of the data representative of the gesture-shortcut associations to a computing device of the plurality of computing devices.

16. The method of claim 13, further comprising:
receiving a text-based search term representative of a shortcut from a computing device;

identifying one or more gestures associated with the shortcut based at least in part on a gesture-shortcut association of the gesture-shortcut language; and transmitting, to the computing device, data representative of the one or more identified gestures associated with the shortcut.

17. The method of claim 13, wherein defining the gesture-shortcut language based at least in part on the aggregated data comprises:
determining a frequency at which a particular gesture is associated with a particular shortcut; and deleting associations of the particular gesture with the particular shortcut when a number of associations between the particular gesture and the particular shortcut are below a threshold number of associations.

18. The method of claim 13, wherein defining the gesture-shortcut language based at least in part on the aggregated data comprises:
determining an amount of time that has elapsed between receiving an indication of an association of a particular gesture with a particular shortcut; and deleting the associations of the particular gesture with the particular shortcut upon determining that the amount of time exceeds a threshold amount of time.

19. A non-transitory computer-readable storage medium encoded with instructions that, when executed, cause one or more processors of a computing device to perform operations comprising:
storing, by the computing device and in a data repository of the computing device, at least a portion of an aggregated group of gesture-shortcut associations;

receiving data representative of a gesture detected by a presence-sensitive screen of the computing device;

identifying, by the computing device and based at least in part on the data representative of the gesture, a first candidate shortcut by at least accessing the portion of the aggregated group of gesture-shortcut associations stored in the data repository;

sending, by the computing device, the data representative of the gesture to a server;

receiving, by the computing device and from the server, an indication of a second candidate shortcut associated with the gesture;

selecting one of the first candidate shortcut and the second candidate shortcut as a shortcut associated with the gesture, wherein the shortcut associated with the gesture corresponds to an action to be performed by the computing device; and outputting, by the computing device, for display, data representative of the shortcut associated with the gesture.

20. A non-transitory computer-readable storage medium encoded with instructions that, when executed, cause one or more processors of a computing device to perform operations comprising:
receiving data representative of group of gestures detected by a plurality of computing devices;

receiving data representative of one or more shortcuts associated with the group of gestures, wherein each of the shortcuts corresponds to an action performed by at least one of the plurality of computing devices;

aggregating, based at least in part on detected similarities between at least one of 1) the group of gestures and 2) the one or more shortcuts associated with the group of gestures, the data representative of the group of gestures and the data representative of the associated shortcuts received from the plurality of computing devices into a plurality of gesture clusters organized into a generational hierarchy of parent and child gesture clusters such that each child gesture cluster of the generational hierarchy includes a plurality of gestures each determined to have features that are less than a first threshold amount different than corresponding features of gestures in a corresponding parent gesture cluster of the generational hierarchy;

receiving data representative of a gesture detected at a presence-sensitive screen of a computing device from one of the plurality of computing devices;

comparing the data representative of the detected gesture to data representative of a parent gesture cluster from the plurality of gesture clusters;

repeating a selection of a child gesture cluster for each generation of gesture clusters until features of gestures included in the respective child gesture cluster are less than a second threshold amount different from corresponding features of the detected gesture;

identifying at least one shortcut associated with the selected child gesture cluster; and transmitting data representative of the at least one shortcut associated with the selected child gesture cluster to the computing device.

21. A device comprising:
at least one processor;

a network interface configured to receive data representative of a group of gestures detected by a plurality of computing devices and receive data representative of one or more shortcuts associated with the group of gestures, wherein each of the shortcuts corresponds to an action performed by at least one of the plurality of computing devices;

a language development module operable by the at least one processor to aggregate, based at least in part on detected similarities between at least one of 1) the group of gestures and 2) the one or more shortcuts associated with the group of gestures, the data representative of the group of gestures and the data representative of the associated shortcuts received from the plurality of computing devices into a plurality of gesture clusters organized into a generational hierarchy of parent and child gesture clusters such that each child gesture cluster of the generational hierarchy includes a plurality of gestures each determined to have features that are less than a first threshold amount different than corresponding features of gestures in a corresponding parent gesture cluster of the generational hierarchy; and a gesture recognition module;

wherein the network interface is further configure to receive data representative of a gesture detected at a presence-sensitive screen of a computing device from one of the plurality of computing devices, wherein the gesture recognition module is operable by the at least one processor to compare the data representative of the detected gesture to data representative of a parent gesture cluster from the plurality of gesture clusters, repeat a selection of a child gesture cluster for each generation of gesture clusters until features of gestures included in the respective child gesture cluster are less than a second threshold amount different from corresponding features of the detected gesture, and identify at least one shortcut associated with the selected child gesture cluster, and wherein the network interface is further configure to transmit data representative of at least one shortcut associated with a selected child gesture cluster to the computing device.

* * * * *